United States Patent
Cherian et al.

(10) Patent No.: US 11,782,868 B2
(45) Date of Patent: Oct. 10, 2023

(54) METHODS AND SYSTEMS TO ACHIEVE MULTI-TENANCY IN RDMA OVER CONVERGED ETHERNET

(71) Applicant: Nicira, Inc., Palo Alto, CA (US)

(72) Inventors: Shoby Cherian, Dublin, CA (US); Tanuja Ingale, Campbell, CA (US); Raghavendra Subbarao Narahari Venkata, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 12 days.

(21) Appl. No.: 17/542,414

(22) Filed: Dec. 4, 2021

(65) Prior Publication Data

US 2022/0092021 A1 Mar. 24, 2022

Related U.S. Application Data

(63) Continuation of application No. 16/561,300, filed on Sep. 5, 2019, now Pat. No. 11,194,755, which is a
(Continued)

(51) Int. Cl.
*G06F 15/167* (2006.01)
*H04L 45/64* (2022.01)
(Continued)

(52) U.S. Cl.
CPC ............ *G06F 15/167* (2013.01); *H04L 41/12* (2013.01); *H04L 45/64* (2013.01); *H04L 45/74* (2013.01);
(Continued)

(58) Field of Classification Search
CPC ... G06F 15/167; H04L 41/12; H04L 67/1097; H04L 69/22; H04L 45/64; H04L 45/74
See application file for complete search history.

(56) References Cited

U.S. PATENT DOCUMENTS 8,122,155 B1 2/2012 Marti
8,244,825 B2 * 8/2012 Subramanian ...... H04L 67/1097
709/215
(Continued)

FOREIGN PATENT DOCUMENTS

CN 104054067 A 9/2014
CN 104753816 A 7/2015
(Continued)

OTHER PUBLICATIONS

Author Unknown, "Ethernet RDMA Technologies," Technology Brief, Oct. 2003, 10 pages, Hewlett-Packard Development Company.
(Continued)

*Primary Examiner* — David R Lazaro
(74) *Attorney, Agent, or Firm* — ADELI LLP

(57) ABSTRACT

A method for providing multi-tenancy support for RDMA in a system that includes a plurality of physical hosts. Each each physical host hosts a set of data compute nodes (DCNs). The method, at an RDMA protocol stack of the first host, receives a packet that includes a request from a first DCN hosted on a first host for RDMA data transfer from a second DCN hosted on a second host. The method sends a set of parameters of an overlay network that are associated with the first DCN to an RDMA physical network interface controller of the first host. The set of parameters are used by the RDMA physical NIC to encapsulate the packet with an RDMA data transfer header and an overlay network header by using the set of parameters of the overlay network to transfer the encapsulated packet to the second physical host using the overlay network.

20 Claims, 16 Drawing Sheets

Related U.S. Application Data continuation of application No. 15/687,522, filed on Aug. 27, 2017, now Pat. No. 10,430,373, which is a continuation of application No. 14/656,368, filed on Mar. 12, 2015, now Pat. No. 9,747,249.

(60) Provisional application No. 62/097,505, filed on Dec. 29, 2014.

(51) Int. Cl.
*H04L 45/74* (2022.01)
*H04L 67/1097* (2022.01)
*H04L 69/22* (2022.01)
*H04L 41/12* (2022.01)

(52) U.S. Cl.
CPC .......... *H04L 67/1097* (2013.01); *H04L 69/22* (2013.01)

(56) References Cited

U.S. PATENT DOCUMENTS

| | | | |
|---|---|---|---|
| 9,176,911 | B2 | 11/2015 | Davis et al. |
| 9,191,262 | B2 | 11/2015 | Kuzmack et al. |
| 9,411,775 | B2 | 8/2016 | Sharp et al. |
| 9,558,146 | B2 | 1/2017 | Sharp et al. |
| 9,747,249 | B2 * | 8/2017 | Cherian .............. H04L 41/12 |
| 10,430,373 | B2 * | 10/2019 | Cherian .............. H04L 41/12 |
| 10,659,523 | B1 * | 5/2020 | Joseph .............. H04L 67/10 |
| 11,068,136 | B1 * | 7/2021 | Koushik .............. G06F 3/0482 |
| 11,194,755 | B2 * | 12/2021 | Cherian .............. H04L 41/40 |
| 2007/0208820 | A1 | 9/2007 | Makhervaks et al. |
| 2009/0106771 | A1 | 4/2009 | Benner et al. |
| 2011/0153935 | A1 * | 6/2011 | Li .............. H04L 45/00 711/E12.017 |
| 2011/0185082 | A1 * | 7/2011 | Thompson .............. H04L 67/02 709/245 |
| 2012/0176934 | A1 * | 7/2012 | Farinacci .............. H04L 61/103 370/254 |
| 2012/0250682 | A1 * | 10/2012 | Vincent .............. H04L 45/74 370/392 |
| 2012/0250686 | A1 * | 10/2012 | Vincent .............. H04L 12/4641 370/392 |
| 2013/0044629 | A1 * | 2/2013 | Biswas .............. H04L 49/356 370/254 |
| 2013/0080561 | A1 * | 3/2013 | Fox .............. H04L 69/08 709/227 |
| 2013/0198311 | A1 * | 8/2013 | Tamir .............. G06F 3/0655 709/212 |
| 2013/0322446 | A1 | 12/2013 | Biswas et al. |
| 2014/0112349 | A1 * | 4/2014 | Moreno .............. H04L 45/64 370/400 |
| 2014/0297775 | A1 * | 10/2014 | Davda .............. G06F 13/28 709/212 |
| 2014/0307554 | A1 * | 10/2014 | Basso .............. H04L 49/351 370/235 |
| 2014/0307555 | A1 * | 10/2014 | DeCusatis .............. H04L 47/39 370/236 |
| 2015/0106489 | A1 * | 4/2015 | Duggirala .............. H04L 61/103 709/222 |
| 2015/0163137 | A1 * | 6/2015 | Kamble .............. H04L 41/5022 370/392 |
| 2016/0026605 | A1 | 1/2016 | Pandit et al. |
| 2016/0188527 | A1 * | 6/2016 | Cherian .............. H04L 41/12 709/212 |
| 2017/0357611 | A1 * | 12/2017 | Cherian .............. H04L 45/64 |
| 2018/0139123 | A1 * | 5/2018 | Qiang .............. H04L 45/64 |
| 2019/0391954 | A1 * | 12/2019 | Cherian .............. H04L 41/12 |
| 2022/0092021 | A1 * | 3/2022 | Cherian .............. H04L 41/122 |

FOREIGN PATENT DOCUMENTS

| | | |
|---|---|---|
| EP | 3241330 B1 | 7/2019 |
| WO | 2016109458 A1 | 7/2016 |

OTHER PUBLICATIONS

PCT International Search Report and Written Opinion for commonly owned International Patent Application PCT/US2015/067735, dated Apr. 18, 2016, 11 pages, International Searching Authority (EPO).

Russell, Robert D., "RDMA Programming Concepts," Apr. 18, 2013, 68 pages, OpenFabrics Alliance, Inc., Durham, New Hampshire.

* cited by examiner

METHODS AND SYSTEMS TO ACHIEVE MULTI-TENANCY IN RDMA OVER CONVERGED ETHERNET

CLAIM OF BENEFIT TO PRIOR APPLICATIONS

This application is a continuation application of U.S. patent application Ser. No. 16/561,300, filed Sep. 5, 2019, now published as U.S. Patent Publication 2019/0391954. U.S. patent application Ser. No. 16/561,300 is a continuation application of U.S. patent application Ser. No. 15/687,522, filed Aug. 27, 2017, now issued as U.S. Pat. No. 10,430,373. U.S. patent application Ser. No. 15/687,522 is a continuation application of U.S. patent application Ser. No. 14/656,368, filed Mar. 12, 2015, now issued as U.S. Pat. No. 9,747,249. U.S. patent application Ser. No. 14/656,368 claims the benefit of U.S. Provisional Patent Application 62/097,505, filed Dec. 29, 2014. U.S. Provisional Patent Application 62/097,505; U.S. patent application Ser. No. 14/656,368, now issued as U.S. Pat. No. 9,747,249; U.S. patent application Ser. No. 15/687,522, now issued as U.S. Pat. No. 10,430,373; and U.S. patent application Ser. No. 16/561,300, now published as U.S. Patent Publication 2019/0391954, are incorporated herein by reference.

BACKGROUND

Remote Direct Memory Access (RDMA) provides read and write service directly between two applications and enables data transfers directly to application buffers without intermediate data copies. RDMA enables memory data transfers to bypass operating systems and kernels.

There are currently several protocols to transfer RDMA packets over networks. Examples of RDMA transfer protocols are RDMA over Converged Ethernet (RoCE) and Internet Wide Area RDMA Protocol (iWARP). RoCE is an Open Systems Interconnection (OSI) model Layer 2 network technology to achieve direct data transfers between two hosts on the same Ethernet network by bypassing the CPU or Kernel.

Currently RoCE Version 1 does not support Internet Protocol (IP) level routing and is not available in a multi-tenant domain. RoCE Version 2 does support IP level routing but is not available in a multi-tenant domain. There are currently no mechanisms to use RDMA data transfer protocols such as RoCE or iWARP using an overlay network that supports multi-tenancy in a Software Defined Data Center.

Today, the encapsulation of an overlay network L2 frame originating from a VM is handled in software. This involves significant work on the part of the overlay network software to maintain and lookup overlay network address mapping tables, and to encapsulate a transmit packet with an outer header that includes relevant overlay network, UDP, IP and Ethernet information before it is sent out on the wire. Similarly the reverse process of decapsulation of the outer header for a received packet is also the responsibility of the software. Each mapping table lookup and encapsulation/decapsulation of packet in software incurs significant CPU cost and affects performance.

BRIEF SUMMARY

Some embodiments provide a method for enabling RDMA transfers via an RDMA data transfer protocol (such as RoCE), which is an L2 technology, in a multi-tenant cloud computing environment over virtual L3 networks. This enables harnessing the power of RDMA technology and achieving the goal of seamless connection between multiple physical and virtual networks, using the Software Defined Network (SDN) approach.

An overlay network is a network virtualization technology that achieves multi-tenancy in cloud computing environment. Some embodiments utilize an overlay network to provide L3 routability and enable RDMA transfers in a multi-tenant environment. These embodiments enable RDMA data transfer over an overlay network by encapsulating RDMA data transfer protocol (such as RoCE or iWARP) packets with overlay network routing header.

The overlay network software is responsible for maintaining an overlay network mapping table to include VM media access control (MAC) address to the tunnel end point IP and other address mappings. Some of these embodiments also program the overlay network interface controller (NIC) with the overlay network address mapping information specific to each RDMA connection in order to offload the encapsulation of RDMA packets with overlay network headers to hardware.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Virtualization is the ability to simulate a hardware platform, such as a server, storage device or network resource, in software. A virtual machine (VM) is a software implementation of a machine such as a computer. Virtual networks are abstractions of a physical network. VMs may communicate using virtual networks. One such virtual network is an overlay network, which is a Layer 2 overlay scheme over a Layer 3 network. An overlay network is a network virtualization technology that achieves multi-tenancy in cloud computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an L2 overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

Overlay networks such as VXLAN and GENEVE are the preferred network virtualization technology to achieve multi-tenancy in a cloud computing environment. An overlay network is an L2 overlay scheme over an L3 network. Overlay network implementation involves encapsulation of traffic with relevant overlay network outer User Datagram Protocol (UDP) headers that enables routing of the L2 traffic in a virtual network.

Some embodiments enable RDMA data transfer over an overlay network by encapsulating an RDMA data transfer protocol (such as RoCE) packets with overlay network routing header. A host that participates in overlay network includes an overlay network virtualization software that covers the configuration/control plane, data plane and overlay network packet processing functionality. The host acts as a tunnel end point. For a VXLAN overlay network, the tunnel end point is known as Virtual Tunnel Endpoint (VTEP).

The RDMA NIC is programmed with the overlay network address mapping information that is specific to each RDMA connection in order to provide L3 routability and multi-tenancy capabilities. In addition, some embodiments offload the encapsulation of RoCE packets with overlay network headers to the NIC hardware. This requires making changes to the current control plane and data plane of the current RDMA software implementation.

Figure 1:
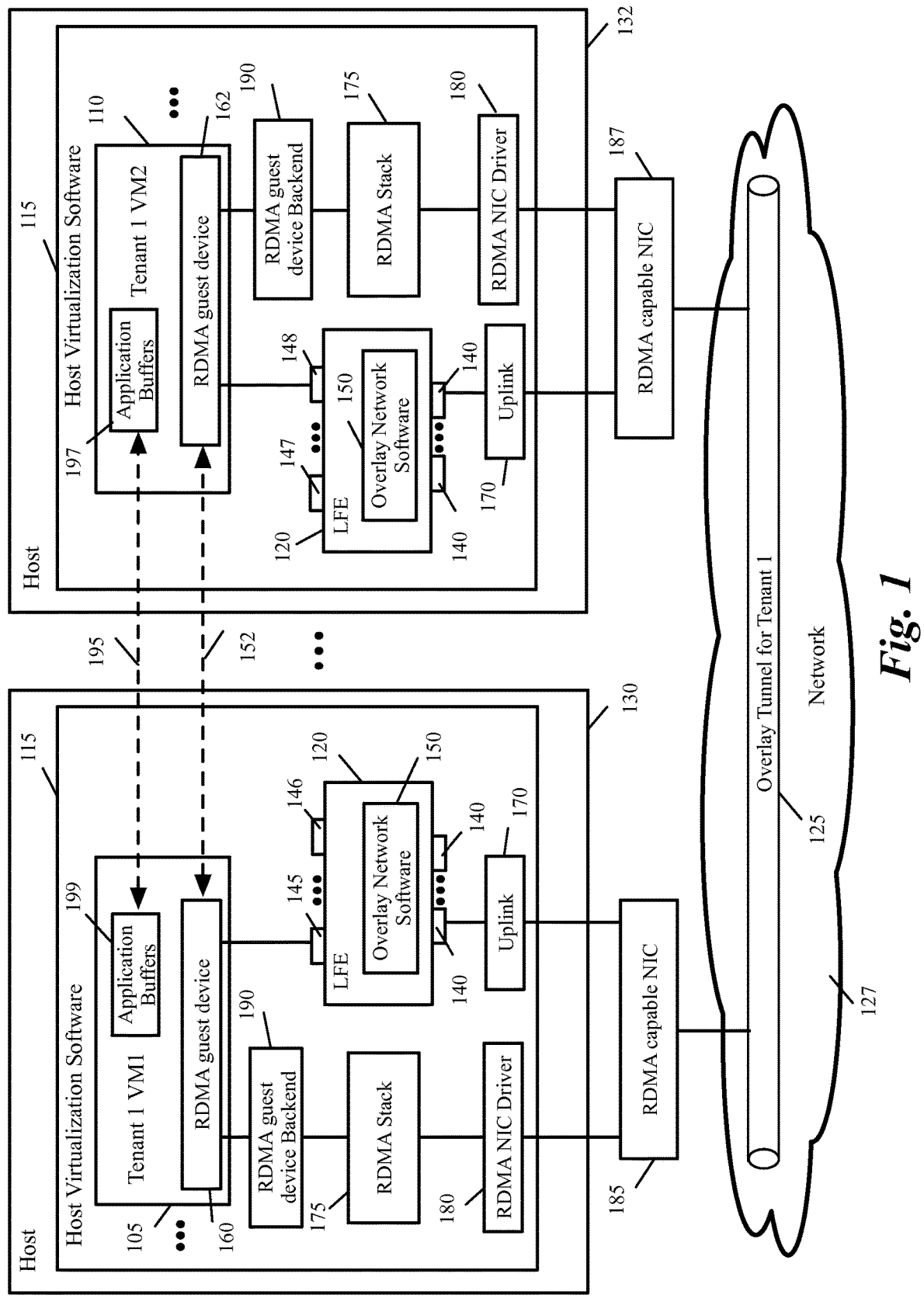
FIG. 1 conceptually illustrates a portion of a virtual infrastructure of some embodiments of the invention that enables RDMA between two virtual machines of the same tenant located on two different hosts.

FIG. 1 conceptually illustrates a portion of a virtual infrastructure of some embodiments of the invention that enables RDMA between two virtual machines of the same tenant located on two different hosts. As shown, several VMs 105-110 are hosted on several physical host machines 130-132.

The virtualized infrastructure in some embodiments is managed by a single cloud management system. The term cloud service refers to services (such as computing, storage, etc.) provided in a distributed manner over a network. The virtualized infrastructure includes a set of host machines 130-132 hosting multiple tenants. Each tenant has one or more VMs. For simplicity, FIG. 1 only shows VMs-105-110 for one tenant (i.e., Tenant 1).

Each host 130-132 includes host virtualization software 115 (sometimes referred to as a hypervisor). The host virtualization software 115 shown in this figure are representative of the various types of virtualization software (e.g., virtual machine monitor, etc.) that may operate on hosts in such a virtualized infrastructure.

In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. In other words, the software forwarding elements are referred to as PFEs because they exist and operate in the physical world, whereas LFEs are a logical representation of a forwarding element that is presented to a user when designing a logical network. In some embodiments, several PFEs are distributed throughout the network implement tenant's LFEs, where each PFE is a local instantiation of an LFE that operate across different host machines and can perform L3 packet forwarding between VMs on the host machine or on different host machines. An LFE is sometimes referred to as a virtual distributed switch (VDS).

In each host 130-132, the LFE 120 connects to a physical network interface card (PNIC) to send outgoing packets and to receive incoming packets. The PNICs 185-187 in FIG. 1 are RDMA capable NICs. In some embodiments, an LFE is defined to include a set of ports 140 through which it connects to the PNIC through the uplink 170 to send and receive packets.

An uplink 170 is a module that relays packets between the LFE 120 and the RDMA capable NIC 185 (or 187) in order to perform various packet processing functions on incoming and outgoing traffic. The RDMA capable NIC 185-187 is a PNIC, also referred to as converged network adapter (CNA), that is programmed to perform Ethernet packet transfers as well as RDMA packet transfers. Each port on a RDMA capable NIC is capable of carrying both Ethernet traffic and RDMA traffic. The RDMA capable NIC in some embodiments registers two logical devices with the host virtualization software 115, one logical device to handle uplink traffic and one logical device to handle RDMA traffic. Each LFE is also defined to have several virtual ports 145-148 to connect to tenant VMs 105-110 through a virtual NIC (VNIC). As described below, the RDMA guest device (or RDMA paravirtualized device) 160-162 provides VNIC functionality as well as interfacing with the RDMA stack 175.

The VNIC functionality in a VM is responsible for exchanging packets between the VM and the network virtualization layer of the host virtualization software 115 through an associated VNIC emulator (not shown). Each VNIC emulator interacts with VNIC drivers in the VMs to send and receive data to and from the VMs. In some embodiments, the virtual NICs are software abstractions of physical NICs implemented by virtual NIC emulators. For instance, the code for requesting and obtaining a connection ID resides in components of VNIC emulators in some embodiments. In other words, the VNIC state is implemented and maintained by each VNIC emulator in some embodiments. Virtual devices such as VNICs are software abstractions that are convenient to discuss as though part of VMs, but are actually implemented by virtualization software using emulators. The state of each VM, however, includes the state of its virtual devices, which is controlled and maintained by the underlying virtualization software.

The VMs 105-110 of a tenant form a logical network (also referred to as private network or virtual network), which is conceptually shown by a dashed line 152. The logical network is an abstraction of a physical network and may provide a virtual Layer 2 (or data link layer) for services such as encapsulation and decapsulation of network layer data packets into frames, frame synchronization, medial access control, etc. The logical network may span one or more physical networks and be organized independent of the underlying physical topology and organization of the physical networks. Each logical network is configured by a tenant.

A host that participates in overlay network includes overlay network virtualization software that covers the configuration/control plane, data plane and overlay network packet processing functionality. The host includes (e.g., as a part of the LFE software) the overlay network virtualization software 150 that acts as a tunnel end point. In the example of VXLAN overlay network, the overlay network virtualization software is referred to as VXLAN Virtual Tunnel Endpoint (VTEP) software and the tunnel end point is known as VTEP. There is a unique identifier associated with each instance of an overlay network. The overlay network software 150 is responsible for maintaining a mapping table to include, e.g., VM MAC to tunnel end point address and other address mappings. The overlay network traffic between a tenant's VMs 105-110 that are hosted on separate hosts 130-132 is passed through a tunnel 125 through the communication network 127. The communication network 127 may include the Internet, local area networks (LANs), wide area networks (WANs), different hardware equipment such as cables, routers, switches, etc.

The VMs 105 and 110 in FIG. 1 belong to the same tenant but are hosted by two different hosts 130 and 132, respectively. In the example of FIG. 1, the two VMs are on two different subnets and have two different IP addresses. VMs 105 and 110 are capable of transferring data using RDMA. Each tenant includes a virtual RDMA device (RDMA guest device) 160-162. Each host virtualization software 115 includes a RDMA guest device backend 190, an RDMA stack or (RDMA protocol stack) 175 and an RDMA NIC driver 180. In some embodiments, the RDMA stack is OpenFabrics Enterprise Distribution (OFED™) open source software used to provide RDMA capability in the host.

RDMA guest device 160-162 is a paravirtualized device. Paravirtualization refers to a technique in which the guest operating system (OS), which is used by a VM, is modified to replace non-virtualizable instructions with hypercalls that communicate directly with the virtualization software of the host. The virtualization software also provides hypercall interfaces to communicate with paravirtualized devices in VMs. The RDMA guest device 160-162 in some embodiments utilizes library calls (e.g., "verbs" library calls) to establish an RDMA connection. These library calls provide semantic description of a required behavior (e.g., are used to provide the information required for establishing an RDMA connection). The calls are used to manage control path objects by creating and destroying objects such as send and receive work queue pairs, completion queues, and memory regions. These application programming interface (API) calls are also used to manage the data path by requesting work processing such as posting sends and receives and requesting for completion event.

The RDMA guest device backend 190 translates library calls from the RDMA guest device in the guest (i.e., VMs 105-100) to RDMA stack 175 calls. The guest physical address space (or the guest virtual address space) is mapped (or translated) to the physical address space of the host (or machine memory address) and passed to the RDMA capable NIC 180. The RDMA capable NIC maintains an address translation table and performs zero-copy DMA directly from/to the guest physical memory.

The RDMA guest device 160-162 in the hosts provide two functionalities. The RDMA guest device 160-162 provides an interface to the RDMA stack 175 and another interface that provides VNIC functionality for the VM. The RDMA guest device 160-162 in some embodiments registers two logical devices with the host virtualization software 115, one logical device that provides VNIC functionality and one logical device to interface with the RDMA stack.

The RDMA guest device 160-162 makes library calls to RDMA guest device backend 190 to establish an RDMA connection between the two VMs. The RDMA guest device 160-162 in the VM 105, that is requesting the establishment of the connection, is associated with a port such as port 145 on the LFE 120. If the port is associated with an overlay network (e.g., the port is associated with a VTEP on a VXLAN network), the information related to the overlay network (such as source VTEP IP, source VTEP MAC, source VTEP VLAN, source VTEP maximum total unit (MTU), inner Destination IP, inner destination MAC, destination VTEP IP, destination VTEP MAC, etc.) is pushed through the RDMA stack 175 and RDMA NIC driver 180 to the RDMA NIC 185, which is a hardware NIC. The RDMA NIC then performs RoCE protocol encapsulation as well as overlay network encapsulation and sends the resulting packets over the overlay network tunnel 125 to the RDMA NIC. 187 connected to the destination host 132.

The destination RDMA NIC 187 decapsulates the packets by removing the outer overlay network header and passes the packets to RDMA stack of the destination host 132 for processing. As described further below, once a connection is established, any request for RDMA data transfer is performed directly between the source and destination VMs through the corresponding RDMA NICs by bypassing the OS and kernels of the source and destination hosts.

The RDMA connection creates a logical RDMA connection, which is conceptually shown by a dashed line 195. The RDMA connection is created between the requesting VM 105 and the destination VM 110 to directly transfer data between the application buffers 197 and 199 of the two VMs that are identified for the RDMA connection. The physical path to transfer data is through the overlay network. Once the requested data arrives at the RDMA NIC 185 associated with the requesting VM's host 130, the RDMA NIC directly transfers the data into the application buffers 199 identified by the requesting VM 105, bypassing the host and guest operating systems and kernels.

Although the RDMA data transfer protocol is described by reference to the example of RoCE, a person of ordinary skill in the art will realize that the same discussions are equally applicable to other RDMA data transfer protocols such as iWARP, which provides RDMA by layering RDMA payload on top of Data Placement Protocol (DDP) which are in turn encapsulated by Stream Control Transmission Protocol (SCTP) and Transmission Control Protocol (TCP) headers.

I. Enabling RDMA Data Transfer Using an Overlay Network

RoCE is described in this section as an example of an RDMA network protocol. RoCE is a network protocol that allows RDMA access over an Ethernet network. RoCE provides message transport services directly to an application as opposed to a traditional network, which requires the application to use the services of the OS to transfer message packets.

Figure 2:
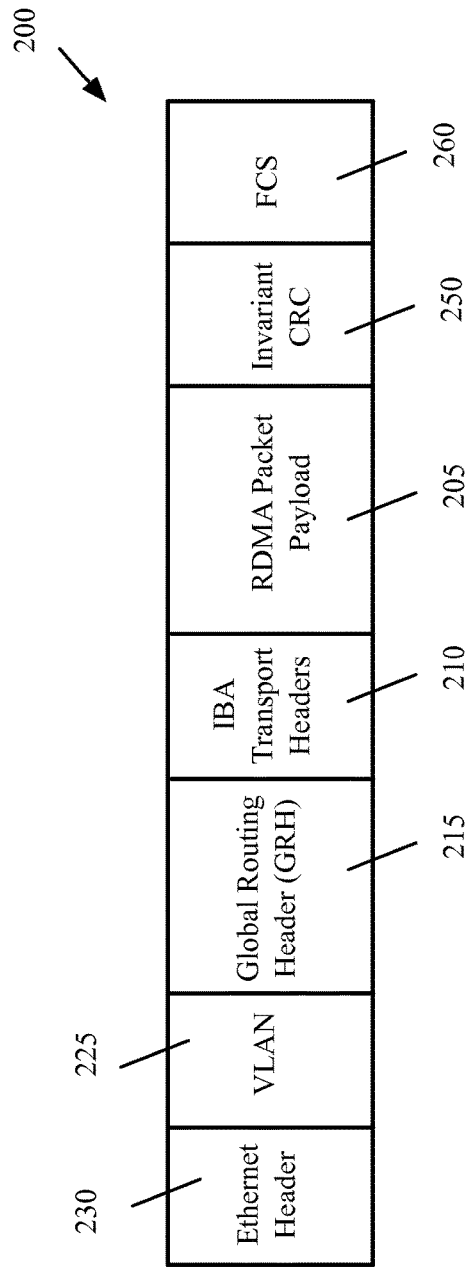
FIG. 2 is a simplified diagram that shows a selected number of fields for RoCE version 1 protocol.

RoCE version 1 is a link layer (i.e., L2) protocol used for RDMA access between hosts that are on the same Ethernet broadcast domain. FIG. 2 is a simplified diagram that shows a selected number of fields for RoCE version 1 (v1) protocol. Further details describing additional fields for RoCE version 1 are described in "Supplement to InfiniBand™ Architecture Specification, Volume 1, Release 1.2.1 Annex A16: RDMA over Converged Ethernet (RoCE)", InfiniBand™ Trade Association, Apr. 6, 2010, which is incorporated herein by reference.

As shown in FIG. 2, RoCE v1 packet structure 200 includes frame check sequence (FCS) 260, invariant Cyclic Redundancy Code (CRC) 250, RDMA packet payload 205, InfiniBand™ architecture (IBA) transport headers 210, global routing header (GRH) 215, a virtual local area network (VLAN) field 225, and Ethernet header 230. The FCS 260 is a CRC that is used to detect any in-transit corruption data of an Ethernet frame. The invariant CRC 250 is a CRC error detecting code that covers all fields of the packet that are invariant from end to end through all switches and routers on the network.

The RDMA packet payload 205 is the actual RDMA packet (or message). The IBA transport headers 210 include the fields such as base transport header and extended transport header used for IBA transport.

The GRH 215 includes fields used for routing the packet between subnets. The VLAN field 225 is an IEEE 802.1Q tag filed that is used to indicate VLAN membership of the frame's port or the frame's port and protocol combination depending on the type of VLAN being used. The Ethernet header 230 includes Ethernet frame fields including source MAC address and destination MAC address. As can be seen, the Ethernet header 230 in RoCE v1 includes only L2 address and does not allow traversal of L3 routers.

In general, RoCE requires a lossless network. With RoCE v1, this is achieved via data center bridging (DCB), which is a set of enhancements to Ethernet local area networks to use the network in a data center environment. By adding the outer headers, the lossless nature of the network has to be preserved across L3 domain. The L3 lossless feature at the routers (e.g., differentiated services code point (DSCP) in the IP header) is used in some embodiments for the outer headers. For instance, some embodiments use assured forwarding (AF) per-hop behavior (PHB) group to provide assurance of delivery. Some of these embodiments utilize an AF Class 3 such as AF31 in the IP header to provide a lossless delivery of packets. The same principle is used for RoCE v2.

Figure 3:
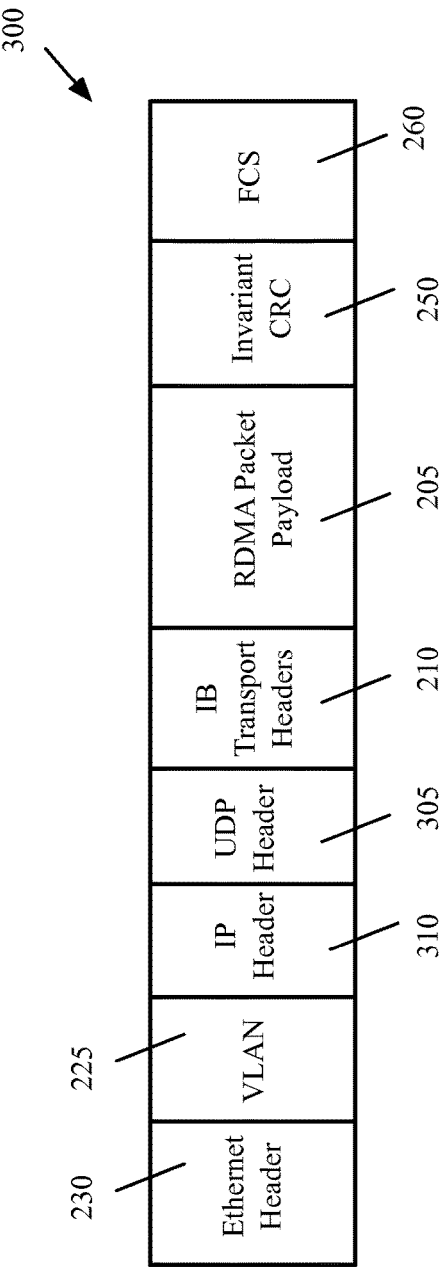
FIG. 3 is a simplified diagram that shows a selected number of fields for RoCE version 2 protocol.

FIG. 3 is a simplified diagram that shows a selected number of fields for RoCE version 2 (v2) protocol. Further details describing additional fields for RoCE version 1 are described in "Supplement to InfiniBand™ Architecture Specification, Volume 1, Release 1.2.1 Annex A17: roCEv2", InfiniBand™ Trade Association, Sep. 2, 2014, which is incorporated herein by reference.

As shown in FIG. 3, RoCE v2 packet structure 300 includes FCS 260, invariant CRC 250, RDMA packet payload 205, IBA transport headers 210, UDP header 305, IP header 310, a VLAN field 225, and an Ethernet header 230. FCS 260, invariant CRC 250, RDMA packet payload 205, IBA transport headers 210, VLAN field 225, and Ethernet header 230 are similar to the fields described above by reference to FIG. 2.

The GRH field 215 of RoCE v1 is replaced by the UDP header 305 and IP header 310 in RoCE v2. The IP header 310 allows traversal of IP L3 routers. The UDP header 305 serves as a stateless encapsulation layer for the RDMA packets over IP. As can be seen, the frame formats of FIG. 2 and FIG. 3 do not provide support for multi-tenancy, in environments such as software defined data centers (SDDCs) that utilize overlay networks to provide multi-tenancy support for host machines that host VMs for multiple tenants.

An application requesting an RDMA connection creates a work queue pair (QP) that includes a send queue and a receive queue. The destination application also creates a matching QP. Each QP represents the endpoint of the channel that connects the two applications for RDMA data transfer. An application requests RDMA services by posting work requests (WRs) such as posting a send request or a work completion request to a work queue.

In order to establish a connection, the two applications initially utilize a special QP (referred to as QP1). Once the connection is established, each application uses a dedicated QP that is created and maintained during the lifetime of the connection.

A. Programming RDMA NIC with Overlay Network Address Mapping Information

Some embodiments provide control path changes that include programming the RDMA NIC with overlay network address mapping information that is specific to each RDMA connection. The overlay network address mapping information is obtained from the overlay network address tables that are maintained in overlay network virtualization software. This enables the NIC hardware to generate outer encapsulation header by referencing the hardware table. RDMA NIC in some embodiments registers its overlay network capability with the overlay network software to receive overlay network address notifications and mapping updates.

In some embodiments the RDMA stack programs overlay network mapping information into the RDMA NIC during the RDMA connection establishment phase. The RDMA NIC native device driver is provided with relevant infrastructure/API to register its overlay network capability with the overlay network software or RDMA stack. Also, necessary infrastructure in terms of callbacks is provided for the RDMA NIC native device driver to receive overlay network configuration and update information. A callback is a function that is passed to another function as a parameter. In some embodiments, a callback is provided to associate/bind the overlay network information with the RDMA NIC device.

In some embodiments, RDMA connection establishment phase utilizes an RDMA-connection manager (RDMA-CM) and involves three broad steps: RDMA address resolution, RDMA connect, and RDMA QP creation and configuration. The following sections describe how, by making new programmatic changes in each of the above connection establishment steps, the RDMA NIC is programmed with overlay network information and achieves support for multi-tenancy in some embodiments of the invention.

The following examples use one VM as the requesting VM (or the client) and another VM as the destination VM (or the server). The same discussions apply to the cases where the client, the server, or both are hosts (instead of VMs). In these cases the destination IP address (instead of referring to a VM IP address) refers to the IP address configured on a kernel VNIC (referred to as vmknic) that is used by the host to connect to an LFE port to communicate with entities outside the host kernel. Accordingly, the invention equally applies to RDMA transfers that involve kernel applications and/or VMs. In either case, the RDMA is performed with the host CPU performing the task of copying data from one memory area to another.

1. RDMA Address Resolution

Figure 4:
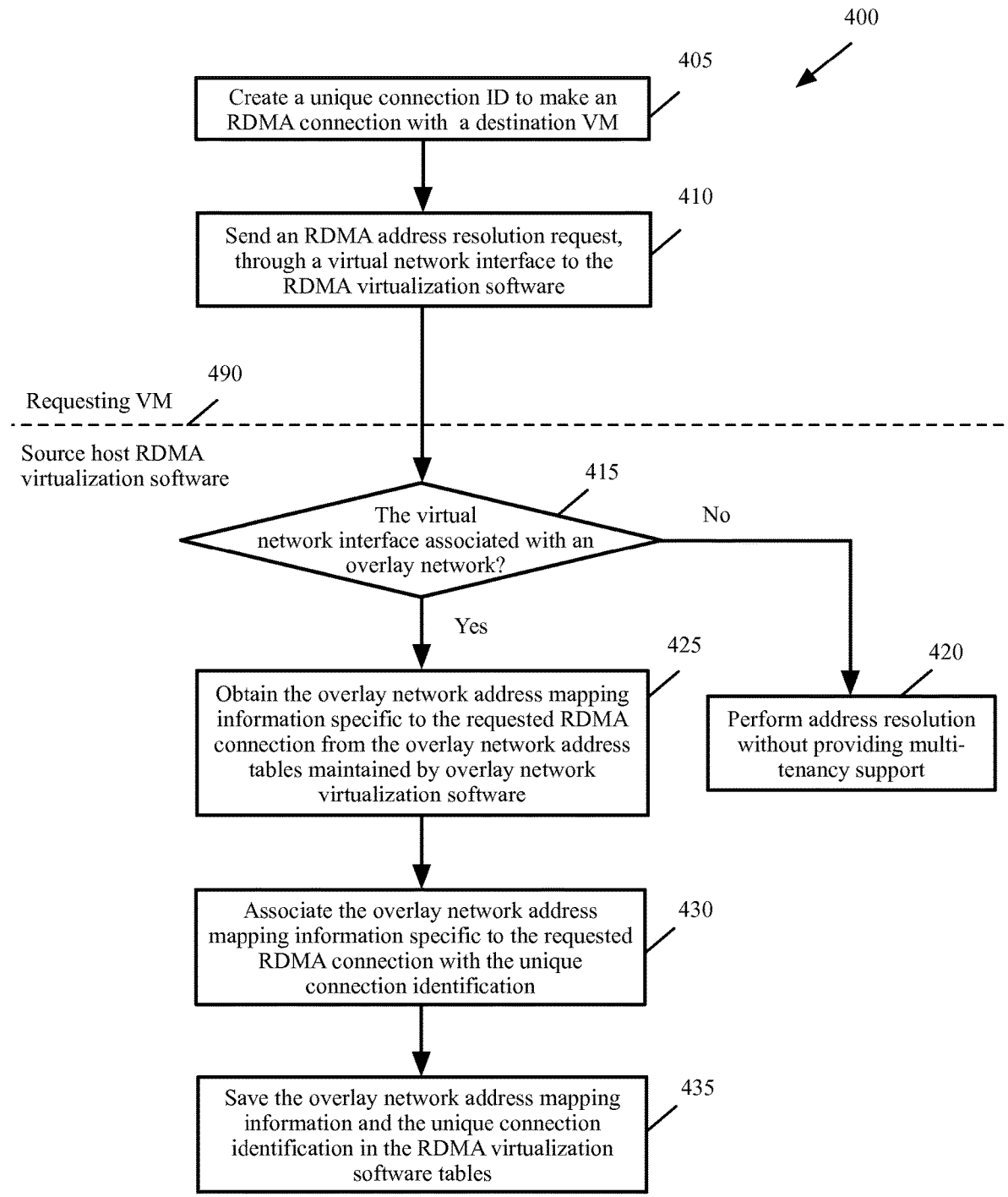
FIG. 4 conceptually illustrates a process initiated by a requesting VM to perform RDMA address resolution in some embodiments of the invention.

FIG. 4 conceptually illustrates a process 400 initiated by a requesting VM to perform RDMA address resolution in some embodiments of the invention. The operations shown above the dashed line 490 are performed by the requesting VM (e.g., by the RDMA guest device 160 shown in FIG. 1) while the operations shown below the line 490 are performed by the RDMA stack 175 of the source host 130 (i.e., the host of the requesting VM 105).

As shown, when an RDMA client (such as VM 105) initiates an RDMA connection using RDMA-CM, the client creates (at 405) a unique connection manager identifier (CM_ID). Next, the process sends (at 410) an RDMA address resolution request to the RDMA stack (e.g., to the RDMA guest device backend 190), through the virtual network interface associated with an overlay network. The process then determines (at 415) whether the virtual network interface is associated with an overlay network (e.g., whether the LFE port 145 that is connected to the VM's RDMA guest device 160 is associated with an overlay network end tunnel such as a VXLAN VTEP).

Currently, as done in a prior art virtualized environment, when an RDMA client initiates connection over a VNIC, the RDMA stack performs address resolution on its behalf, to obtain the corresponding routing information. The RDMA stack then associates/binds this virtual network interface and its properties {CM_ID, Source IP, Source MAC, Source VLAN, Source MTU} with the RoCE device via a programmatic interface (e.g., a bindSourceInfo driver callback). This binding is uniquely identified by the CM_ID and is in existence during the course of the RDMA connection. The RDMA stack invokes the driver callback to program this information into the RDMA NIC. As can be seen, this mechanism does not provide support for multi-tenancy over an overlay network such as VXLAN where each tenant can define its own logical network.

When process 400 determines that the virtual network interface is not associated with an overlay network, the process performs (at 420) address resolution (as done in prior art) by binding the virtual network interface and its properties {CM_ID, Source IP, Source MAC, Source VLAN, Source MTU} with the RDMA NIC without providing multi-tenancy support. The CMD-ID is the unique connection manger identification, source IP, source MAC, source VLAN, and source MTU are the IP address, MAC address, associated VLAN, and the maximum total unit (MTU) of the VTEP associated with the VM requesting the RDMA connection. The MTU of a communication protocol layer is the size (in bytes) of the largest protocol data unit (PDU) that the layer can pass forward.

Process 400 provides a novel mechanism for providing multi-tenancy for RDMA data transfer when the virtual network interface is associated with an overlay network (e.g., when the LFE port 145 that is connected to the VM's RDMA guest device 160 is associated with an overlay network end tunnel such as a VXLAN VTEP). Specifically, if the process determines (at 415) that the virtual network interface is associated with an overlay network, the RDMA stack skips any address resolution on its part. Instead, the RDMA stack relies on the overlay network virtualization software as a source for obtaining address mapping information. The RDMA stack retrieves (at 425) the associated overlay network address mapping information from the overlay network table maintained by the overlay network virtualization software.

Figure 5:
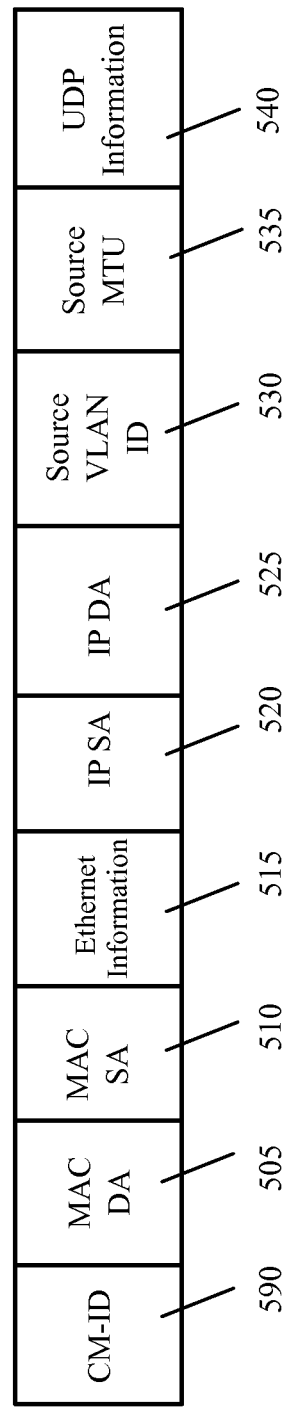
FIG. 5 conceptually illustrates the overlay network information tuple obtained by the RDMA stack from an overlay network address mapping tables in some embodiments of the invention.

FIG. 5 conceptually illustrates the overlay network information tuple obtained by the RDMA stack in some embodiments of the invention. As shown, for a given source and destination VM IP address for the RDMA connection, the following address resolution is performed. There are two steps in address resolution for a given destination IP address: determine local RDMA guest device to use and determine the destination end tunnel information. The local RDMA guest device is determined based on the LFE uplink and the paired RDMA guest device. The destination end tunnel information is determined by using address resolution protocol (ARP) to determine the inner destination MAC address (i.e., the Mac address of the destination VM) and the outer destination end tunnel information (e.g., the VXLAN destination VTEP IP and MAC addresses) using the overlay network bridge tables via the overlay network virtualization software. The overlay network information for source end tunnel (e.g., the VXLAN source VTEP MAC address, VXLAN source VTEP IP address, the source VLAN) is locally stored in overlay address mapping tables maintained by the overlay network software. The required information for the source end tunnel is retrieved from these tables.

The tuple for the address resolution in some embodiments include: destination end tunnel MAC address 505 (e.g., VXLAN destination VTEP MAC address), source end tunnel MAC address 510 (e.g., VXLAN source VTEP MAC address), Ethernet information 515 (e.g., Ethernet type or any other information needed for the Ethernet packets header), source end tunnel IP address 520 (e.g., VXLAN destination VTEP IP address), destination end tunnel IP address 525 (e.g., VXLAN destination VTEP IP address), source end tunnel VLAN ID 530 (e.g., source VXLAN Network Identifier (VNI)), source MTU 535 (source VTEP MTU), UDP information 540 (e.g., UDP source port, VXLAN port, etc.).

The tuple 505-540 along with the CM-ID 590 created to establish the RDMA connection is sent to the RDMA enabled NIC. The RDMA enabled NIC uses the information to encapsulate the RDMA packets by the headers required to transport the packets using the overlay network. The fields shown in FIG. 5 are examples of what may be needed to encapsulate RDMA packets to transport the packets using an overlay network. Depending on the particular overlay network and the particular network configuration, different embodiments retrieve different information from the overlay network address mapping tables in the host and push them to the RDMA enabled NIC.

Referring back to FIG. 4, process 400 then associates (at 430) the tuple 500 with the CM_ID 590 so that it is unique for the current RDMA connection. The process then saves (at 435) the overlay network address mapping information and the CM-ID in RDMA stack tables for use during the existence of the connection. As described below, the overlay network address mapping information and the CM-ID are used in an address handle structure for the initial connection datagrams that are used by the RDMA stack in some embodiments. The address handle is an object that describes the path from the local port to the remote port. The address handle describes the other end of the RDMA connection used in a QP.

In the OFED™ programming model, the QP connection is established by providing the address handle. For example, for a "Reliable Connection QP", the QP is modified with the address handle that specifies the destination global identifier (GID), destination local identifier (LID), and destination MAC address during the connection establishment. This is a one time operation during a reliable connection, which is connection oriented. In the case of "unreliable datagram (UD) QP", each work request that is sent on a UD queue pair should have an address handle that specifies the destination GID, LID, destination MAC.

Some embodiments change the address handle to reflect the destination VTEP information. Other embodiments map the RDMA CM-ID with the address handle. CM-ID has the entire tuple (source VTEP and destination VTEP) that can be passed to the RDMA NIC driver. The RDMA NIC driver in some embodiments combines this CM-ID binding information and address handle to encapsulate the packets for a given post send operation. In the receive path, the RDMA NIC in some embodiments decapulates the outer headers in addition to inner headers and posts the RDMA payload to the corresponding QP. However, the RDMA NIC needs to validate the outer headers and inner headers before posting to the application buffers.

2. RDMA Connect

Figure 6:
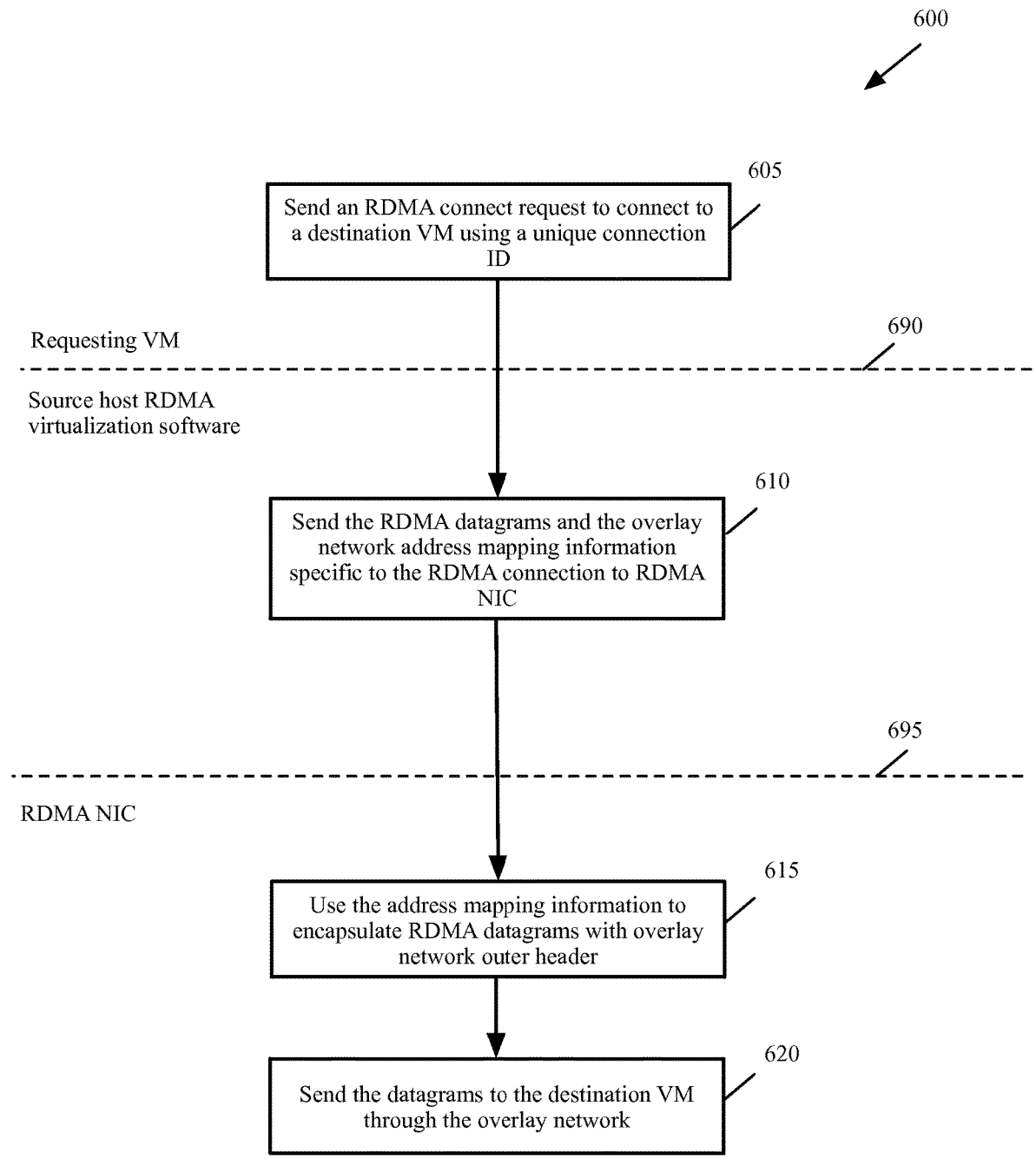
FIG. 6 conceptually illustrates a process initiated by a requesting VM to perform RDMA request an RDMA connection in some embodiments of the invention.

FIG. 6 conceptually illustrates a process 600 initiated by a requesting VM (or client) to request an RDMA connection in some embodiments of the invention. The operations shown above the dashed line 690 are performed by the requesting VM (e.g., by the RDMA guest device 160 shown in FIG. 1), the operations shown below the line 695 are performed by the RDMA NIC (e.g., RDMA NIC 185), and the operations shown between the lines 690 and 695 are performed by the RDMA stack 175 of the source host 130 (i.e., the host of the requesting VM 105). As shown, the process sends (at 605) an RDMA connect request to connect to a destination VM using a previously created CM-ID.

For RDMA connection requests via RDMA-CM, a special QP type, referred to as general service interface (GSI) QP or QP1, is used to send the initial connection datagrams (referred to as Management Datagram or MAD) to the destination end of the RDMA connection. In some embodiments, new fields are added in the address handle structure that is used by the RDMA virtualization stack. These new fields hold the overlay network address mapping tuple that was computed as described above by reference to FIG. 4. The RDMA virtualization stack sends down (at 610) the MAD buffer along with the modified address handle structure to the RDMA NIC.

The RDMA NIC then uses (at 615) the overlay network address mapping information to encapsulate RDMA datagrams with the overlay network outer header. Specifically, the RDMA NIC in some embodiments retrieves the CM_ID, source address and overlay network mapping information from the address handle structure. The RDMA NIC computes the outer VXLAN header based on the modified address handle structure and encapsulate the inner packet (the connection MAD) with it. The RDMA NIC then sends (at 620) the encapsulated packet out on the virtual network wire to the destination VM (or server).

Figure 7:
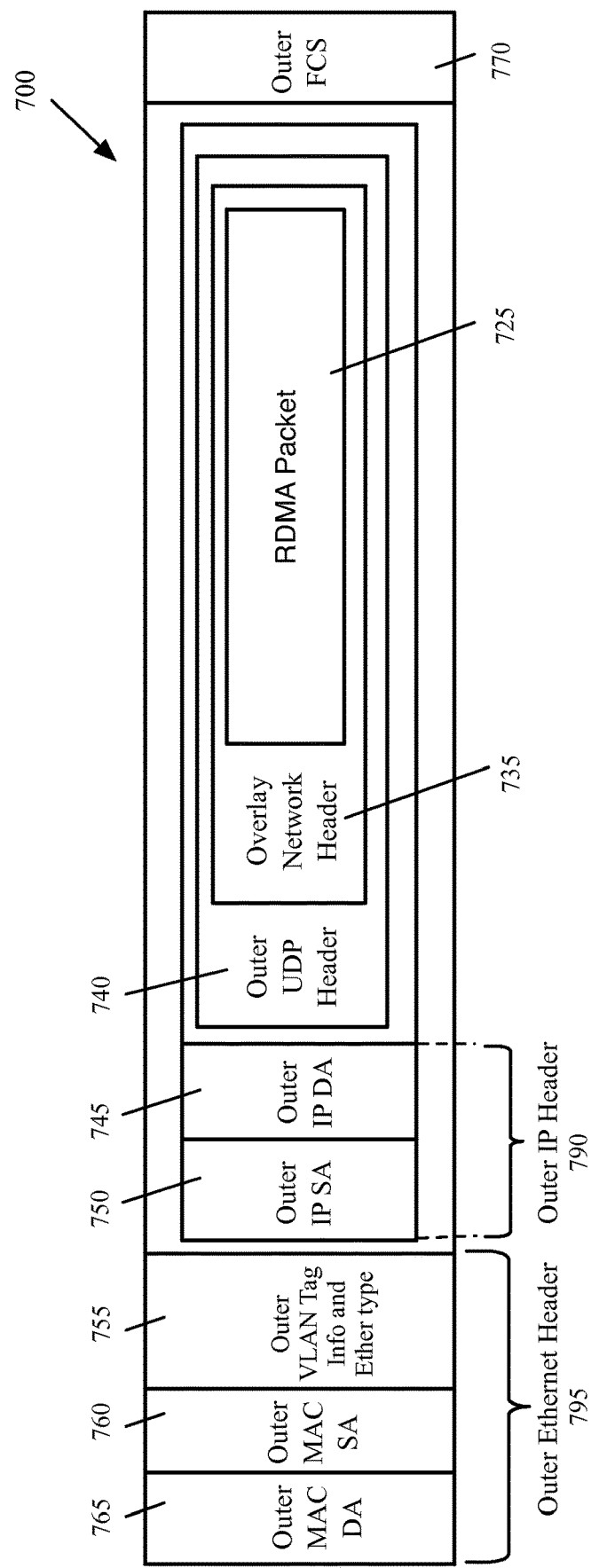
FIG. 7 is a simplified diagram that shows a selected number of fields for encapsulating RDMA protocol packets in an overlay network header in some embodiments of the invention.

FIG. 7 is a simplified diagram that shows a selected number of fields for encapsulating RDMA protocol packets in an overlay network header in some embodiments of the invention. As shown, the encapsulated packet structure 700 includes RDMA packet 725. The RDMA packet 725, for example, is a RoCE v1 packet 200 shown in FIG. 2, RoCE v2 packet 300 shown in FIG. 3, an iWARP packet, or any other RDMA protocol packet that is going to be exchanged between two VMs.

The RDMA packet 725 is wrapped in an overlay network header 735 that includes the overlay network identification (e.g., a VXLAN header that include the VXLAN ID). This inner frame is further wrapped in a UDP header 740 (referred to as outer UDP). The result is further wrapped in outer IP header 790, which includes IP address 745 of the destination end tunnel (e.g., the VXLAN destination VTEP IP address) and the IP address 750 of the source end tunnel (e.g., the VXLAN source VTEP IP address). The result is further wrapped in an outer Ethernet header 795 (which includes outer virtual local area network (VLAN) tag information (e.g., VXLAN tag information) and Ether type 755, the source end tunnel MAC address 760 (e.g., the VXLAN source VTEP MAC address), and the destination end tunnel MAC address 765) (e.g., the VXLAN destination VTEP MAC address). Finally, the overlay network encapsulation includes an optional outer FCS 770. By doing the outer wrapping, the overlay network creates a logical network for VMs across different networks. The overlay network (e.g., VXLAN) creates a Layer 2 network on top of Layer 3 networks. The fields 735-765 and the optional outer FCS 770 are herein referred to as the outer header and the encapsulated packet 700 is referred to as the outer packet.

FIG. 7 is a simplified diagram that shows a selected number of fields for an overlay network encapsulation. For an example of an overlay network, further details describing additional fields for VXLAN encapsulation is described in "VXLAN: A Framework for Overlaying Virtualized Layer 2 Networks over Layer 3 Networks", by M. Mahalingam, et al., Network Working Group, Aug. 26, 2011, which is incorporated herein by reference. Although this document refers to this selected fields for simplicity, a person of ordinary skill in the art will realize that encapsulating packets for overlay networks such as VXLAN, GENEVE, etc., require encapsulating the packets with the entire outer header of the overlay network.

In FIG. 7, the outer wrap is used to deliver the L2 payload through an L3 network. For instance, the outer source IP source address is the IP address of the source VTEP and the outer destination IP address is the IP address of the destination VTEP. The outer source MAC address is the MAC address of the source VTEP and the outer destination MAC address is the MAC address of the next network entity (such as a router of gateway) on the path from the source VTEP to the destination VTEP.

In some embodiments, the VTEP for VXLAN includes the following components: A VM kernel component that is part of the LFE and is used for VXLAN data path processing, which includes maintenance of forwarding tables; a VM kernel NIC virtual adapter to carry VXLAN traffic, and a VXLAN port group that dictates how VXLAN traffic is carried in and out of the host VTEP through the physical NICs.

The outer IP header 790 allows traversal of IP L3 routers. The UDP header 740 serves as a stateless encapsulation layer for the RDMA packets over IP, the VLAN field 755 is an IEEE 802.1Q tag filed that is used to indicate VLAN membership of the frame's port or the frame's port and protocol combination depending on the type of VLAN being used.

Figure 8:
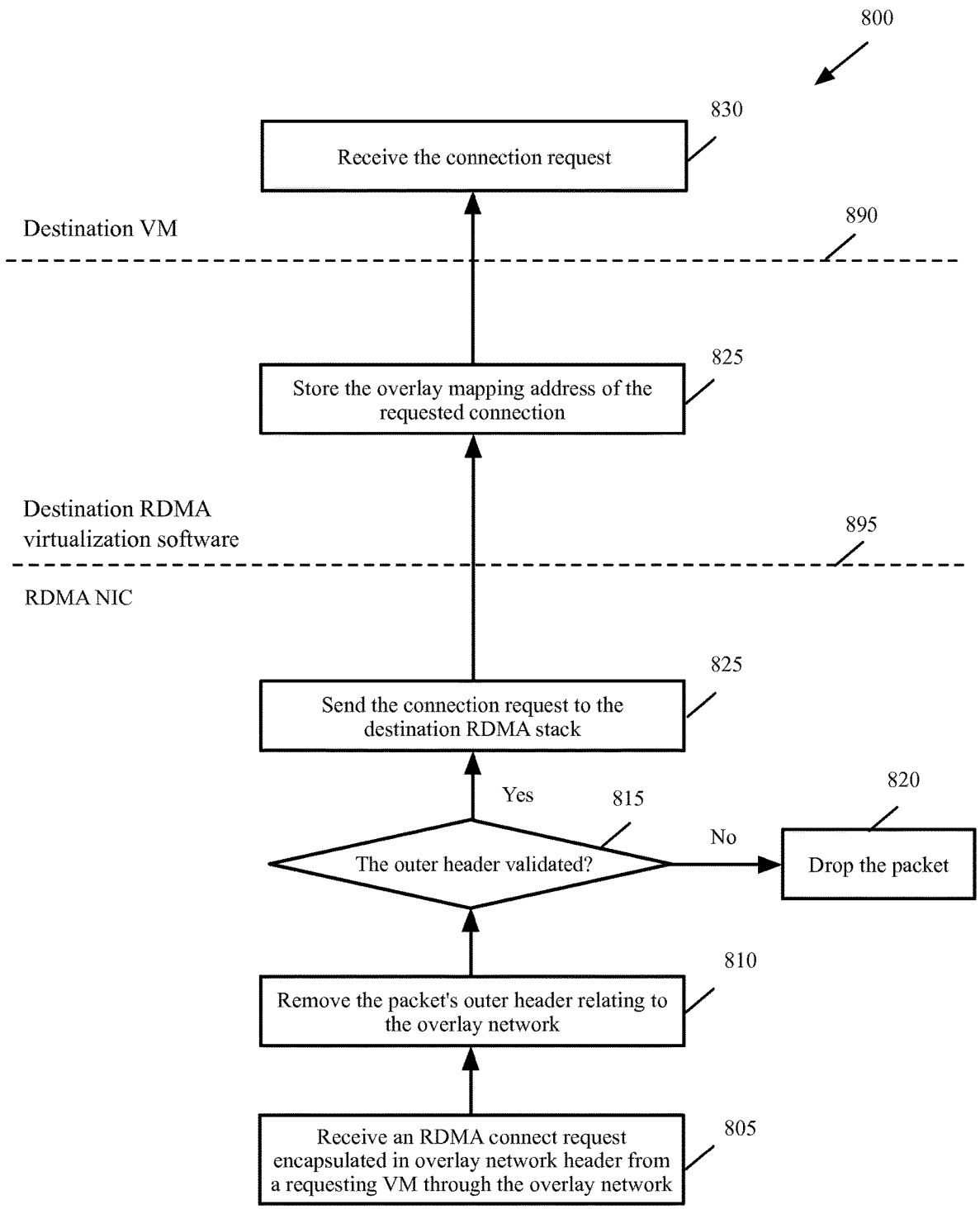
FIG. 8 conceptually illustrates a process performed when a destination RDMA NIC receives an RDMA connect request in some embodiments of the invention.

FIG. 8 conceptually illustrates a process 800 performed when a destination RDMA NIC (e.g., RDMA NIC 187 shown in FIG. 1) receives an RDMA connect request in some embodiments of the invention. The operations shown above the dashed line 890 are performed by the destination VM (e.g., by the RDMA guest device 162 shown in FIG. 1), the operations shown below the line 895 are performed by the RDMA NIC (e.g., RDMA NIC 187), and the operations shown between the lines 890 and 895 are performed by the RDMA stack 175 of the destination host 132.

As shown, the process receives (at 805) an RDMA connect request encapsulated in overlay network header from a requesting VM through the overlay network. For instance, the RDMA NIC on the receiving end of the RDMA connection receives the overlay network encapsulated MAD packet on QP1. The process then removes (at 810) the packet's outer header relating to the overlay network. The overlay network information from the outer header is consumed and validated (e.g., against the source VXLAN/VTEP information in a VXLAN network). The process determines (at 815) whether the overlay network information is valid. For instance, whether the incoming VXLAN information matches with the VXLAN for the receiving VM. If not, the packet is dropped (at 820).

Otherwise, the process (using the receiving RDMA NIC) strips the outer overlay network header and sends (at 825) the MAD along with the outer overlay network header information (that is extracted by the RDMA NIC from the packet) up to the RDMA stack for connection request acceptance/rejection. The process then reads, by the RDMA stack, the fields from the MAD buffer's address handle structure and learns about the overlay network mapping information. The process then stores (at 825) the overlay mapping address of the requested connection. The process receives (at 830) the connection request at the destination VM for acceptance or rejection.

Figure 9:
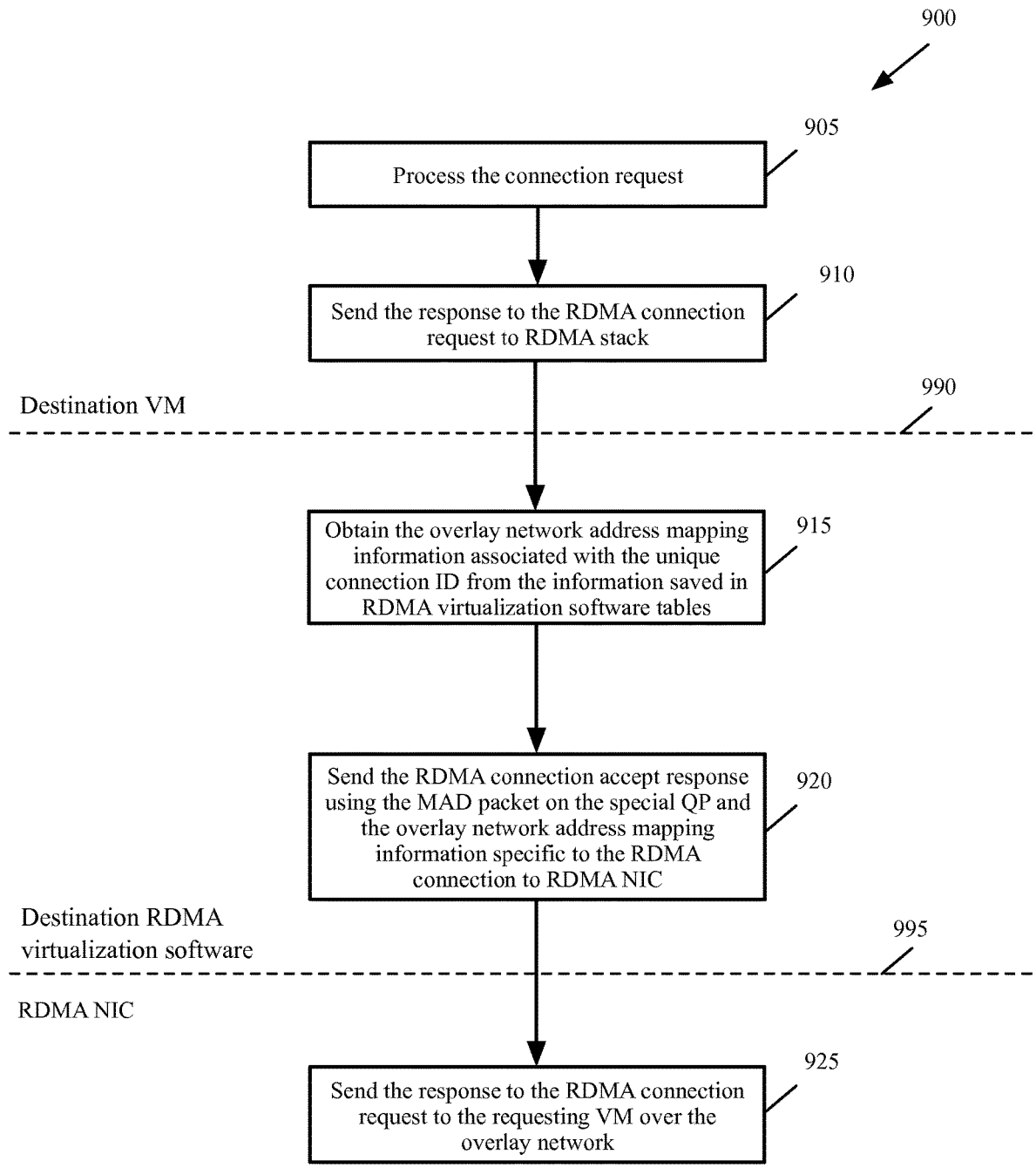
FIG. 9 conceptually illustrates a process performed to send the acceptance or rejection of an RDMA connection request from a destination VM to a requesting VM in some embodiments of the invention.

FIG. 9 conceptually illustrates a process 900 performed to send the acceptance or rejection of an RDMA connection request from a destination VM to a requesting VM in some embodiments of the invention. The operations shown above the dashed line 990 are performed by the destination VM, the operations shown below the line 995 are performed by the destination RDMA NIC, and the operations shown between the lines 990 and 995 are performed by the RDMA stack of the destination host.

As shown, the connection request is processed (at 905) by the destination VM. Next, process 900 sends (at 910) the response to the RDMA connection request to RoCE virtualization software.

The RoCE virtualization software has learned the overlay network routing information based on operation 825, described above by reference to FIG. 8. The process, by the RDMA stack, obtains (at 915) the overlay network address mapping information associated with the CM-ID from the information saved in the RDMA stack table during the learning process. While sending the connection accept response via MAD packet on QP1, the RoCE virtualization software on the destination host populates the address handle structure with the overlay network mapping table, and sends (at 920) the MAD packet to NIC. The RoCE hardware looks up overlay network information from the address handle structure of the MAD buffer, constructs the outer overlay network header and encapsulates the MAD response with the overlay network outer header and sends (at 925) the packet on the Virtual Network.

Figure 10:
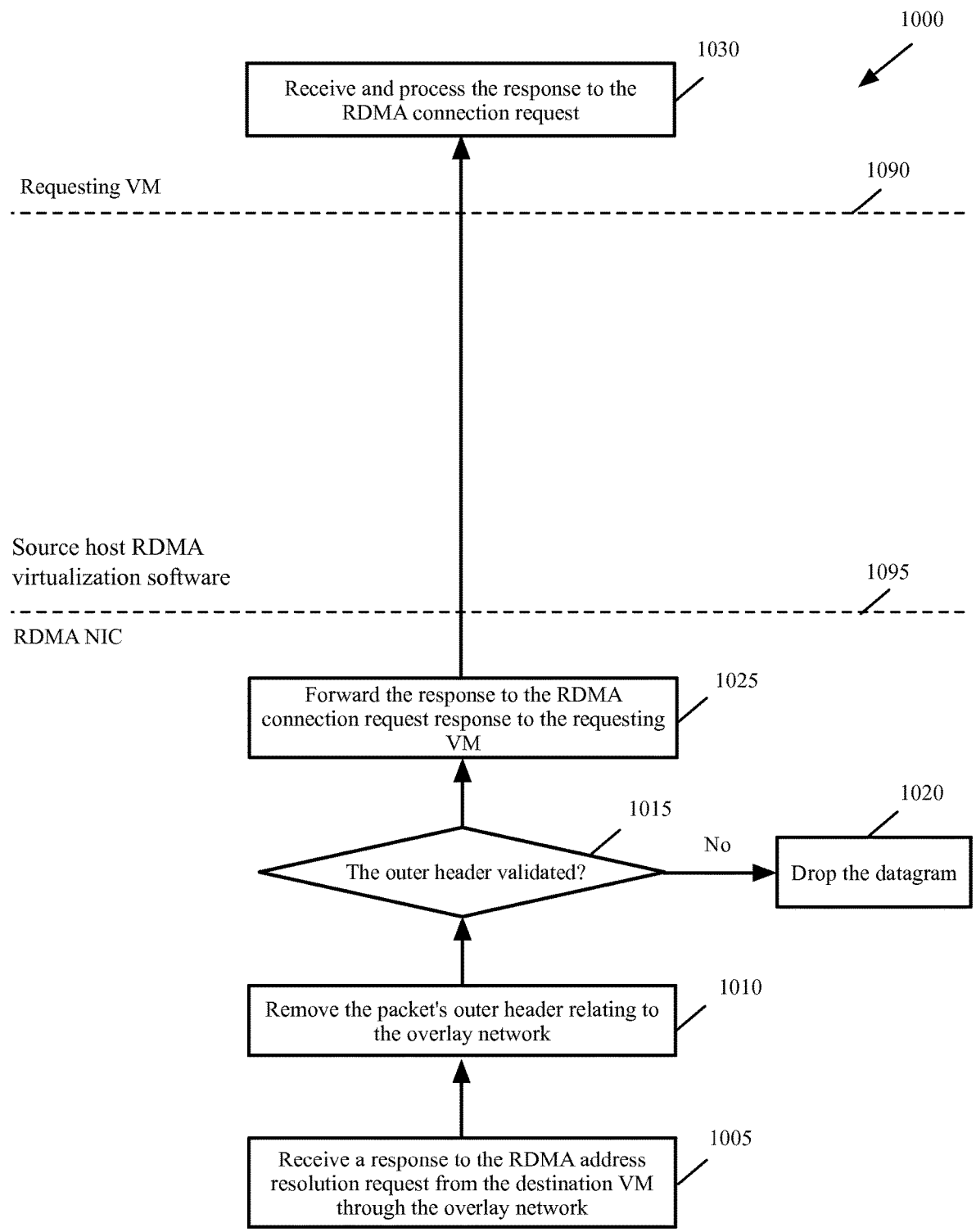
FIG. 10 conceptually illustrates a process performed when the acceptance or rejection of an RDMA connection request from a destination VM is received at a requesting VM in some embodiments of the invention.

FIG. 10 conceptually illustrates a process 1000 performed when the acceptance or rejection of an RDMA connection request from a destination VM is received at a requesting VM in some embodiments of the invention. The operations shown above the dashed line 1090 are performed by the VM requesting the RDMA connection, the operations shown below the line 1095 are performed by the RDMA NIC associated with the requesting VM's host, and the operations shown between the lines 1090 and 1095 are performed by the RDMA stack of the requesting VM's host.

As shown, the process receives (at 1005) the response to the RDMA address resolution request at the RDMA NIC from the destination VM through the overlay network. The RDMA NIC removes (at 1010) the packet's outer header relating to the overlay network. The overlay network information from the outer header is consumed and validated (e.g., against the source VXLAN/VTEP information in a VXLAN network). The process determines (at 1015) whether the overlay network information is valid. If not, the packet is dropped (at 1020).

Otherwise, the process (using the RDMA NIC) strips the outer overlay network header and sends (at 1025) the RDMA connection request response to the requesting VM. The process then receives and processes (at 1030), by the requesting VM, the response to the RDMA connection request.

3. RDMA Queue Pair Creation

The RDMA client creates a QP for a connection before the RDMA connect is completed. As a part of RDMA connect, the client (e.g., the requesting VM) passes the client connection parameters to the server (e.g., the destination VM). One of the connection parameters is the QP number associated to the created QP. The server receives this connection information. Before the server sends the connection accept, the server has created a QP. The server sends the QP number to the client as part of the connection accept.

The initial connection MADs are exchanged over QP1. Once the RDMA connection is established, the RDMA client and RDMA server use the QP created for the connection for carrying the RDMA (e.g. RoCE) traffic/data for that connection. In some embodiments, once a request for data queue pair creation comes in, the RDMA stack modifies the queue pair properties. And as part of modifying the queue pair properties, the overlay network address mapping information is added to the properties of the queue pair.

As part of Modify Queue Pair, the properties of the queue pair are programmed in the RoCE hardware. The overlay network mapping information gets associated with this queue pair in the hardware. In other words, once a QP is created for a connection, the QP is modified by the address handle of the connection.

Figure 11:
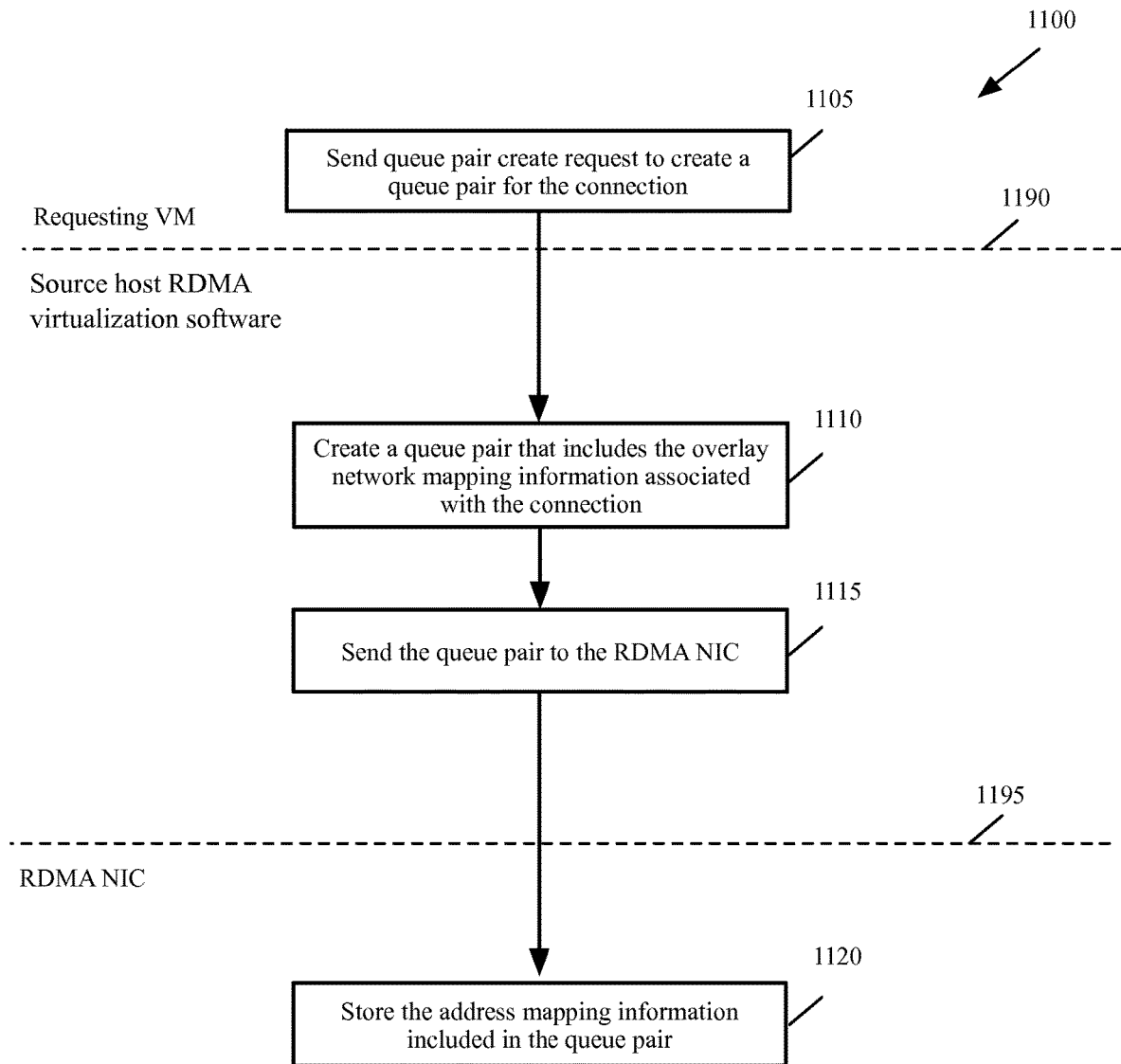
FIG. 11 conceptually illustrates a process performed when a queue pair is created by the VM that has requested the establishment of the RDMA connection in some embodiments of the invention.

FIG. 11 conceptually illustrates a process 1100 performed when a queue pair is created by the VM that has requested the establishment of the RDMA connection in some embodiments of the invention. The operations shown above the dashed line 1190 are performed by the requesting VM, the operations shown below the line 1195 are performed by the RDMA NIC associated with the requesting VM's host, and the operations shown between the lines 1190 and 1195 are performed by the RDMA stack of the requesting VM's host.

As shown, the process sends (at 1105) the QP create request to create a QP for the connection to the RDMA stack. The process creates (at 1110), by the RDMA stack, a QP that includes the overlay network mapping information associated with the connection. The process then sends (at 1115) the QP to the RDMA NIC. The process then stores (at 1120), by address mapping information included the QP.

Figure 12:
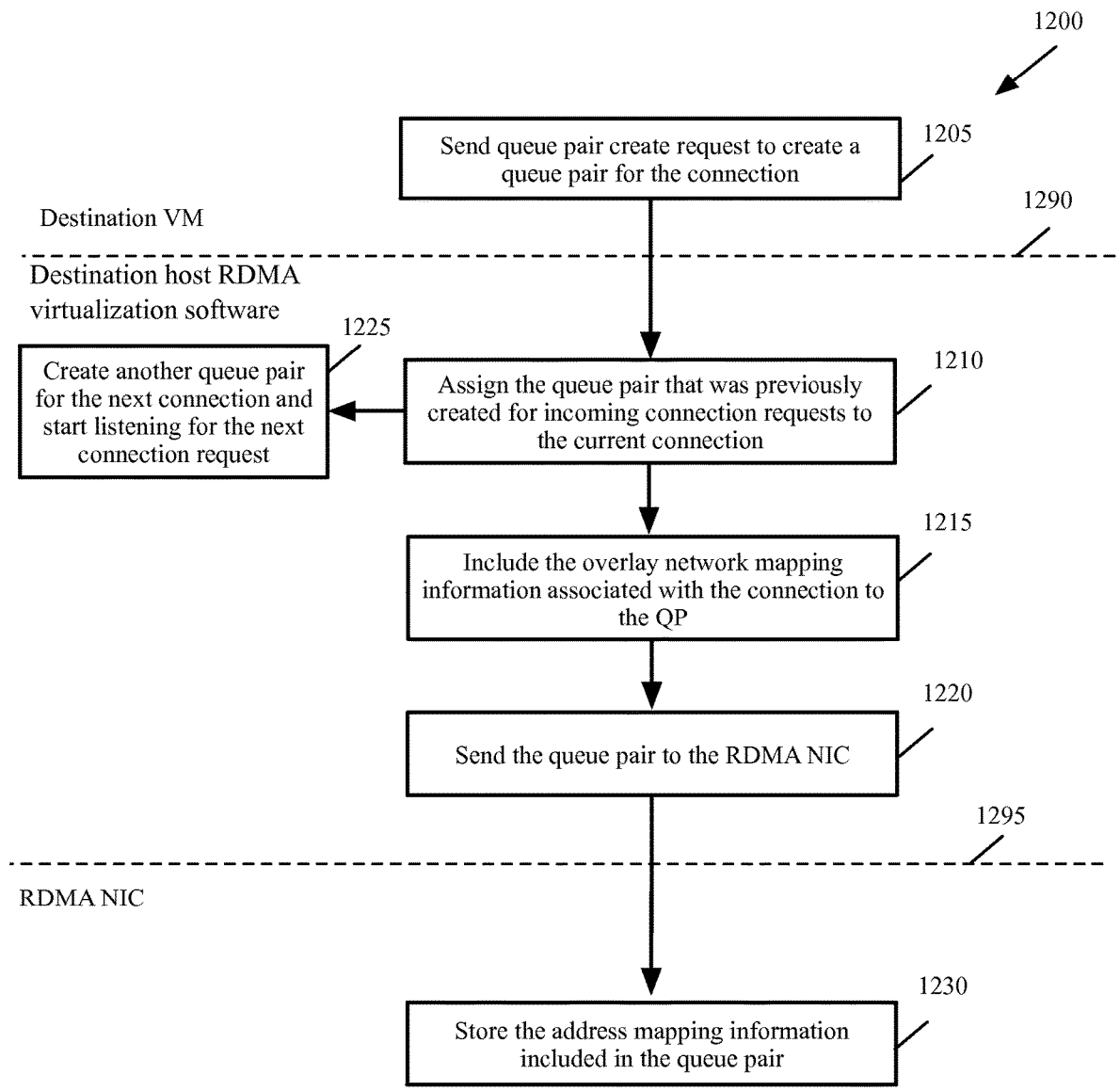
FIG. 12 conceptually illustrates a process performed when a queue pair is created by the destination VM in some embodiments of the invention.

FIG. 12 conceptually illustrates a process 1200 performed when a queue pair is created by the destination VM in some embodiments of the invention. The operations shown above the dashed line 1290 are performed by the destination VM, the operations shown below the line 1295 are performed by the RDMA NIC associated with the destination VM's host, and the operations shown between the lines 1290 and 1295 are performed by the RDMA stack of the destination VM's host.

As shown, the process sends (at 1205) the QP create request to create a QP for the connection to the RDMA stack. In some embodiments, the requesting VM (or the server) creates a QP for an RDMA connection before a request for an RDMA connection is received. The server then listens for an RDMA connection request. Once the request for connection is received, the process assigns (at 1210) the QP to the requested connection. The process then includes (at 1215) the overlay network mapping information associated with the connection to the QP. The process then sends (at 1220) the QP to the RDMA NIC. The process also forks and creates (at 1225) another QP and listens for the next RDMA connection request. The process also stores (at 1220), by the RDMA NIC the address mapping information included the QP.

B. RDMA Data Transfer Over the Established Connection

Once the properties of the QP are programmed in the RDMA NIC hardware with the overlay network information, any data messages, referred to as Work Requests (WRs) that are sent down on the created QP are encapsulated with relevant overlay network outer headers by the RDMA NIC hardware before sending them out on the virtual network wire.

Figure 13:
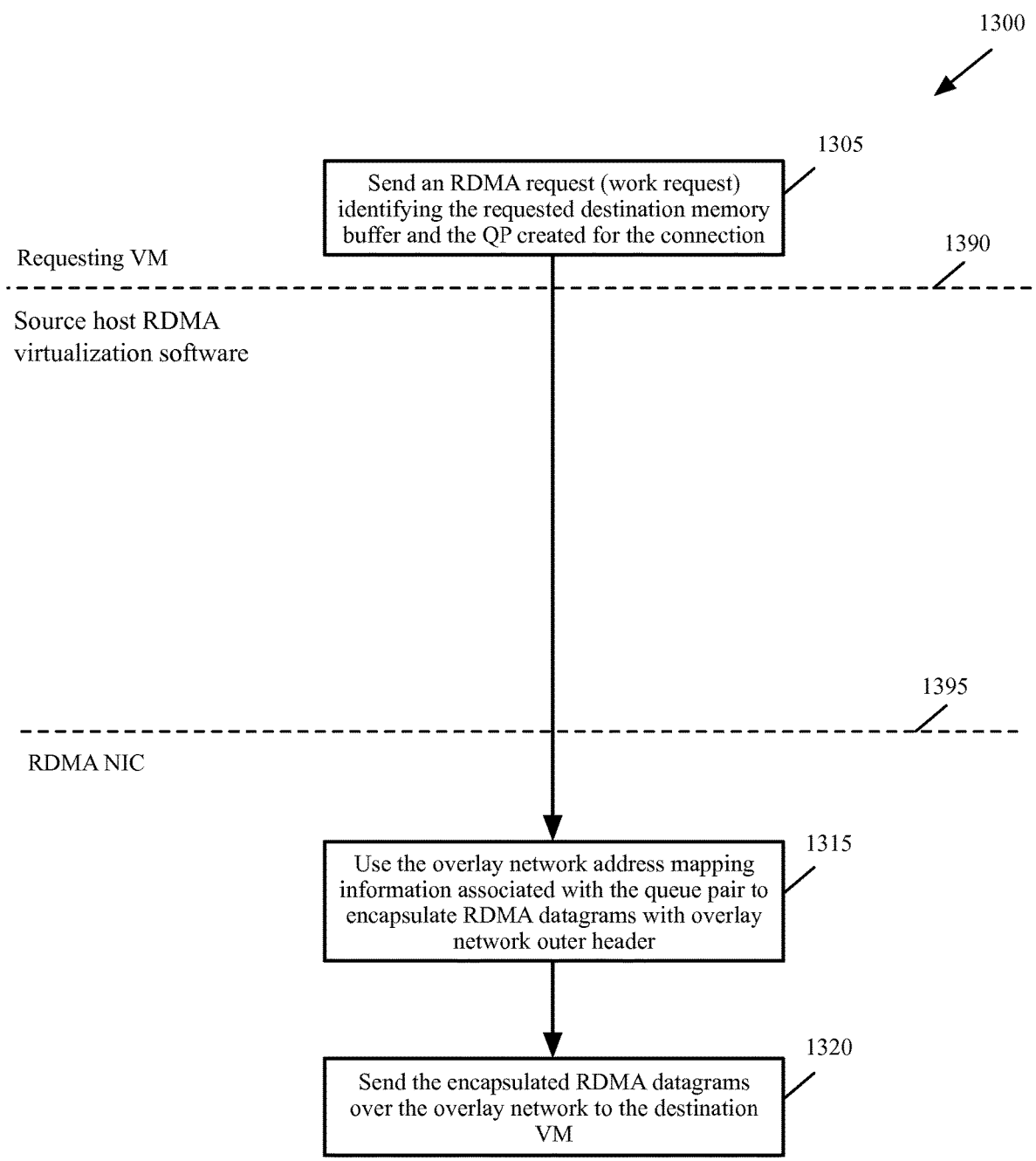
FIG. 13 conceptually illustrates a process performed for requesting data transfer using RDMA in some embodiments of the invention.

FIG. 13 conceptually illustrates a process 1300 performed for requesting data transfer using RDMA in some embodiments of the invention. The operations shown above the dashed line 1390 are performed by the requesting VM, the operations shown below the line 1395 are performed by the RDMA NIC associated with the requesting VM's host, and the operations shown between the lines 1390 and 1395 are performed by the RDMA stack of the requesting VM's host.

As shown, the process sends (at 1305) an RDMA request from the requesting VM to the RDMA NIC. The RDMA request specifies the requested buffer in the destination VM as well as the QP created for the connection. In case of an RDMA write request, the data to write into the destination VM memory is also included in RDMA request. The process then uses (at 1315) overlay network address mapping information associated with the QP to encapsulate RDMA datagrams with overlay network outer header. The process then sends (at 1320) the encapsulated RDMA datagrams over the network to the destination VM.

Figure 14:
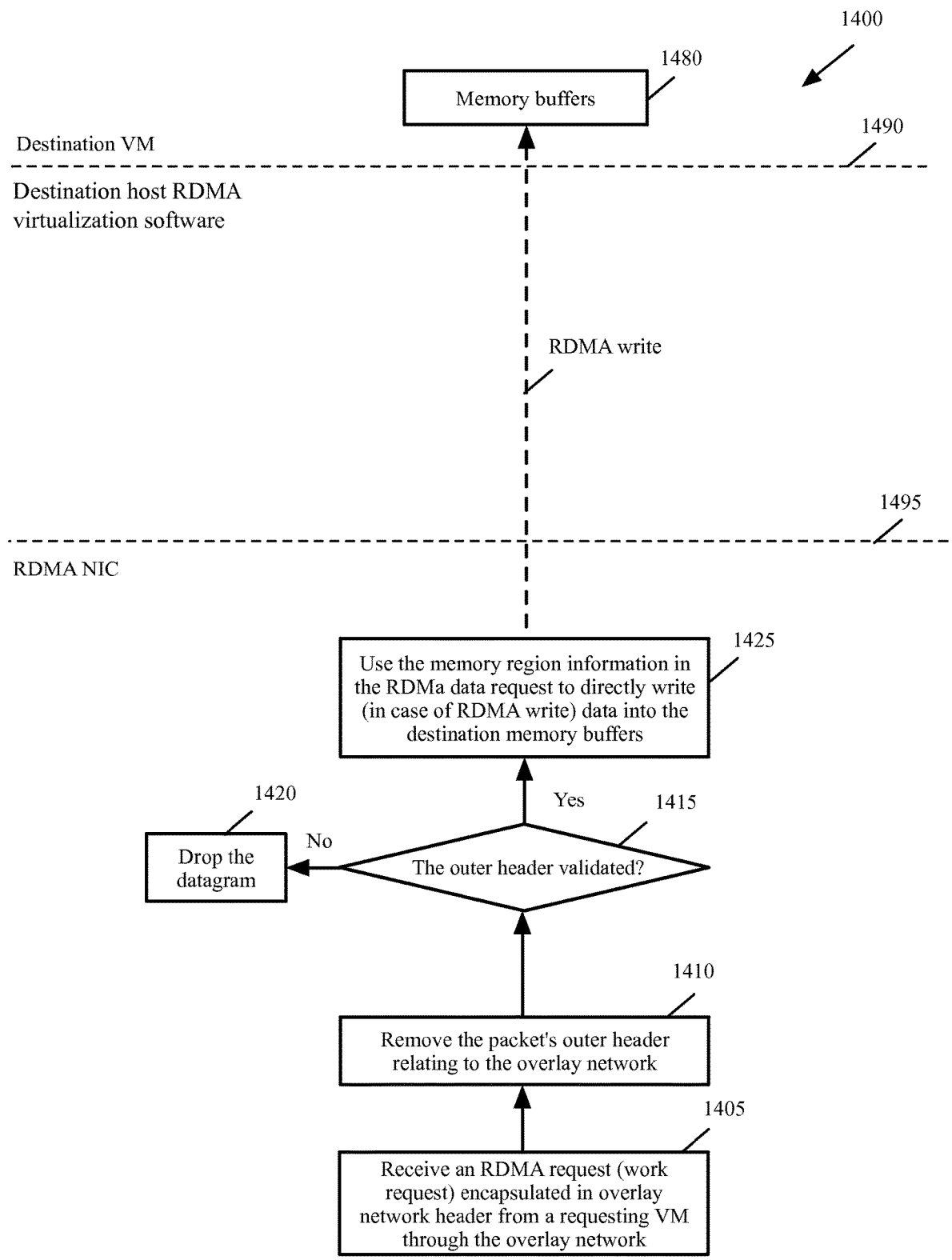
FIG. 14 conceptually illustrates a process performed to use RDMA to write data into memory of a destination VM in some embodiments of the invention.

FIG. 14 conceptually illustrates a process 1400 performed to use RDMA to write data into memory of a destination VM in some embodiments of the invention. The operations shown above the dashed line 1490 are performed by the destination VM, the operations shown below the line 1495 are performed by the RDMA NIC associated with the destination VM's host, and the operations shown between the lines 1490 and 1495 are performed by the RDMA stack of the destination VM's host.

As shown, the process receives (at 1405) an RDMA request from a requesting VM at the destination RDMA NIC through the overlay network. The RDMA data request specifies the requested buffer in the destination VM. The process removes (at 1410) the packet's outer header relating to the overlay network. The overlay network information from the outer header is consumed and validated (e.g., against the source VXLAN/VTEP information in a VXLAN network). The process determines (at 1415) whether the overlay network information is valid. If not, the packet is dropped (at 1420).

Otherwise, the process, by the receiving RDMA NIC, uses (at 1425) the memory region information in the RDMA request to directly write the data received in the RDMA packet from the RDMA NIC into the memory buffers of the destination VM bypassing the destination host operating system and kernel (i.e., a zero-copy transfer zero-copy transfer). Zero-copy refers to operations in which the central processing unit (CPU) does not perform the task of copying data from one memory area to another.

Figure 15:
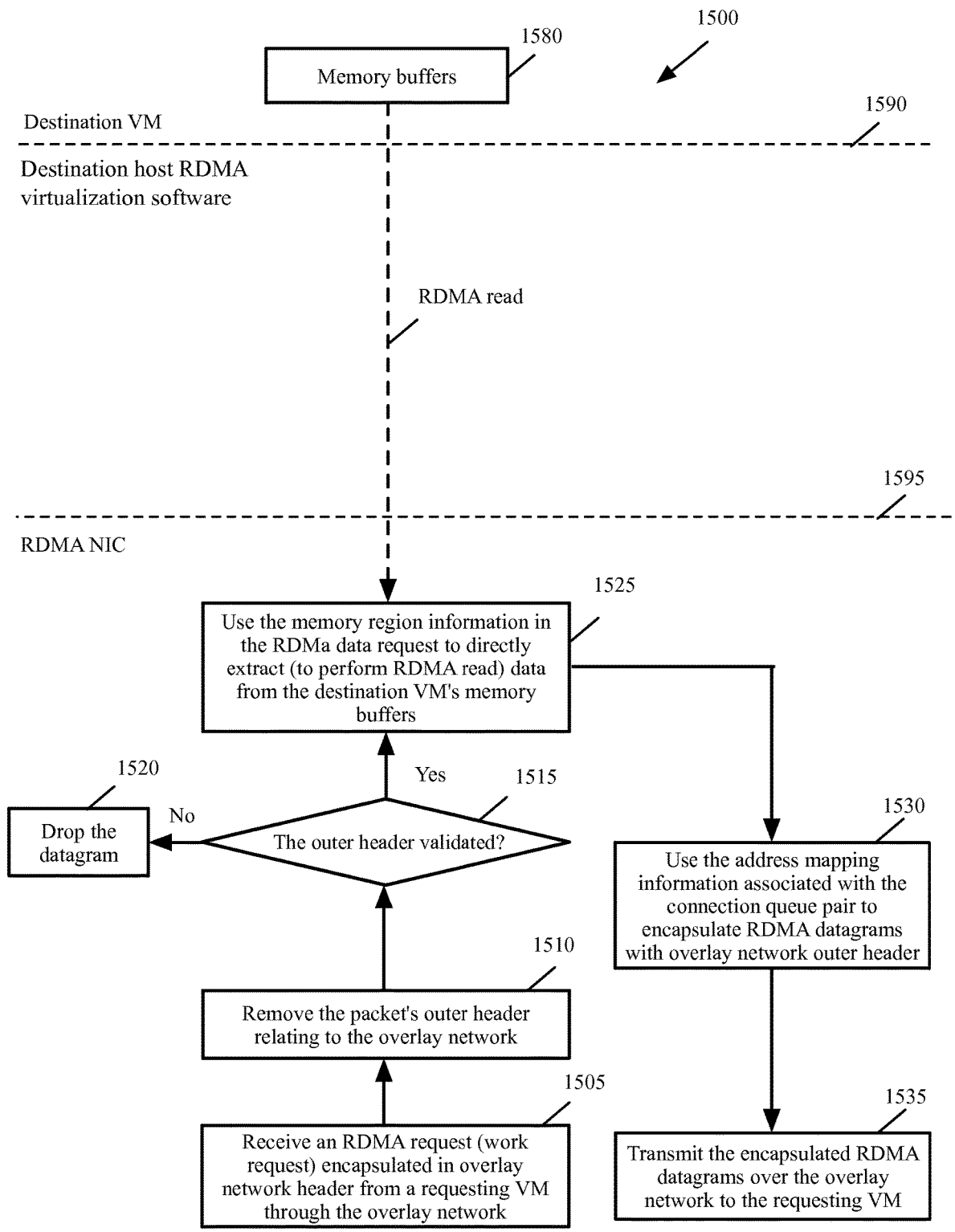
FIG. 15 conceptually illustrates a process performed to use RDMA to read data from memory of a destination VM in some embodiments of the invention.

FIG. 15 conceptually illustrates a process 1500 performed to use RDMA to read data from memory of a destination VM in some embodiments of the invention. The operations shown above the dashed line 1590 are performed by the destination VM, the operations shown below the line 1595 are performed by the RDMA NIC associated with the destination VM's host, and the operations shown between the lines 1590 and 1595 are performed by the RDMA stack of the destination VM's host.

As shown, the process receives (at 1505) an RDMA request from a requesting VM at the destination RDMA NIC through the overlay network. The RDMA data request specifies the requested buffer in the destination VM. The process removes (at 1510) the packet's outer header relating to the overlay network. The overlay network information from the outer header is consumed and validated (e.g., against the source VXLAN/VTEP information in a VXLAN network). The process determines (at 1515) whether the overlay network information is valid. If not, the packet is dropped (at 1520).

Otherwise, the process by the receiving RDMA NIC, uses (at 1525) the memory region information in the RDMA request to directly extract data from the destination VM's memory buffers 1580 bypassing the destination host operating system and kernel (i.e., performing a zero-copy transfer).

The process then uses the address mapping information associated with the connection queue pair to encapsulated (at 1530) RDMA datagrams containing the requested data with the overlay network outer header. The process then sends (at 1535) the encapsulated RDMA datagrams over the overlay network to the requesting VM.

Figure 16:
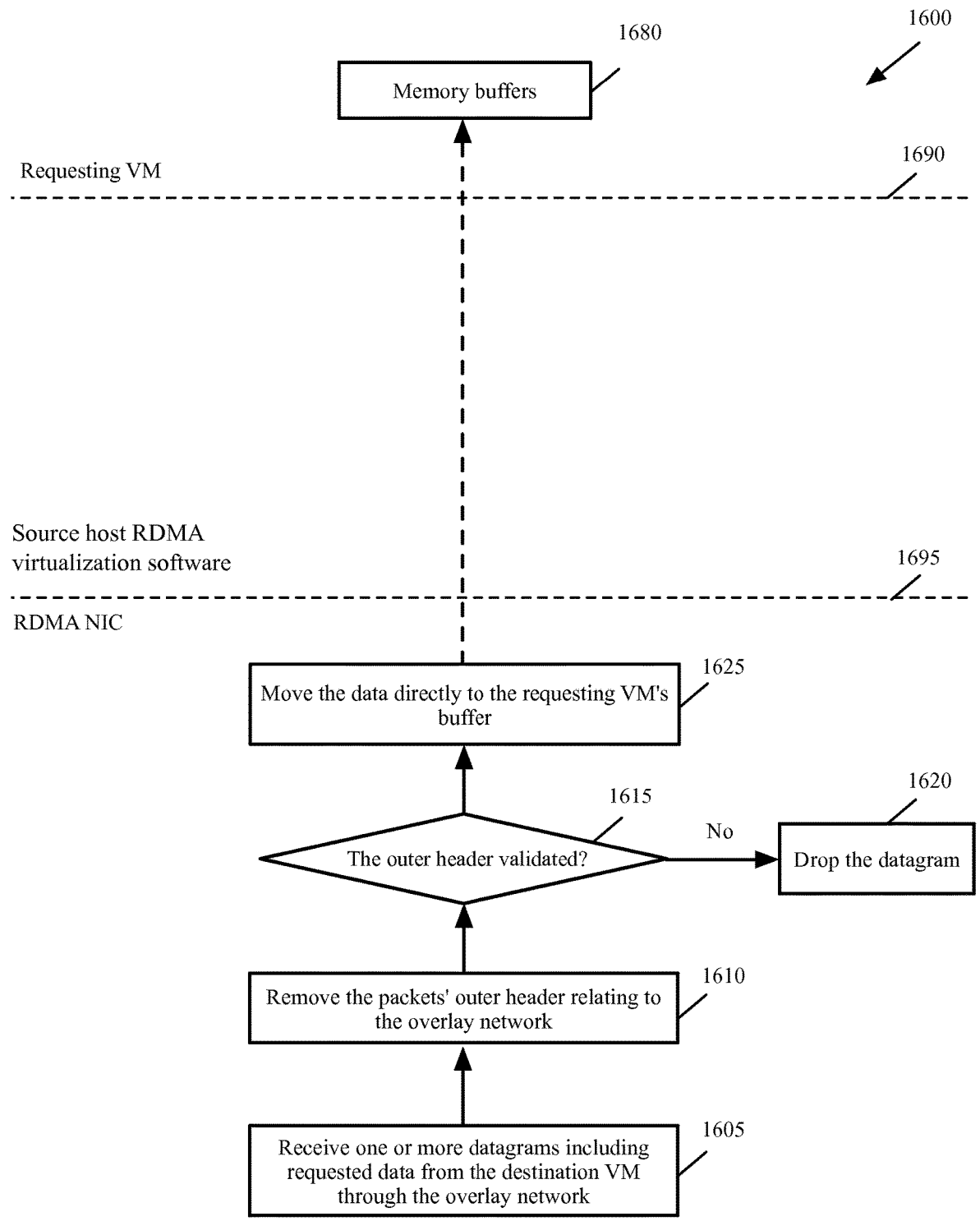
FIG. 16 conceptually illustrates a process performed to receive the requested RDMA data from a destination VM at a requesting VM in some embodiments of the invention.

FIG. 16 conceptually illustrates a process 1600 performed to receive the requested RDMA data from a destination VM at a requesting VM in some embodiments of the invention. The operations shown above the dashed line 1690 are performed by the requesting VM, the operations shown below the line 1695 are performed by the RDMA NIC associated with the requesting VM's host, and the operations shown between the lines 1690 and 1695 are performed by the RDMA stack of the requesting VM's host.

As shown, the process receives (at 1605) one or more datagrams including the requested data from the destination VM through the overlay network. The process then removes (at 1610) the packets' outer header relating to the overlay network. The process then determines (at 1615) whether the overlay network valid. If not, the process drops (at 1620) the datagram.

Otherwise, the process, by the RDMA NIC, uses (at 1625) the memory region information in the RDMA data packets to directly move the data into the requesting VM's memory buffers 1580.

As can be seen from FIGS. 4, 6, and 8-13, the commands for address resolution, connection creation, and QP creation are handled through the RDMA stack. As can be seen from FIGS. 14-16, the actual RDMA data transfer is done directly to/from the VMs' memory buffers and the RDMA NICs bypassing the operating system kernels of the host and guests operating systems.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
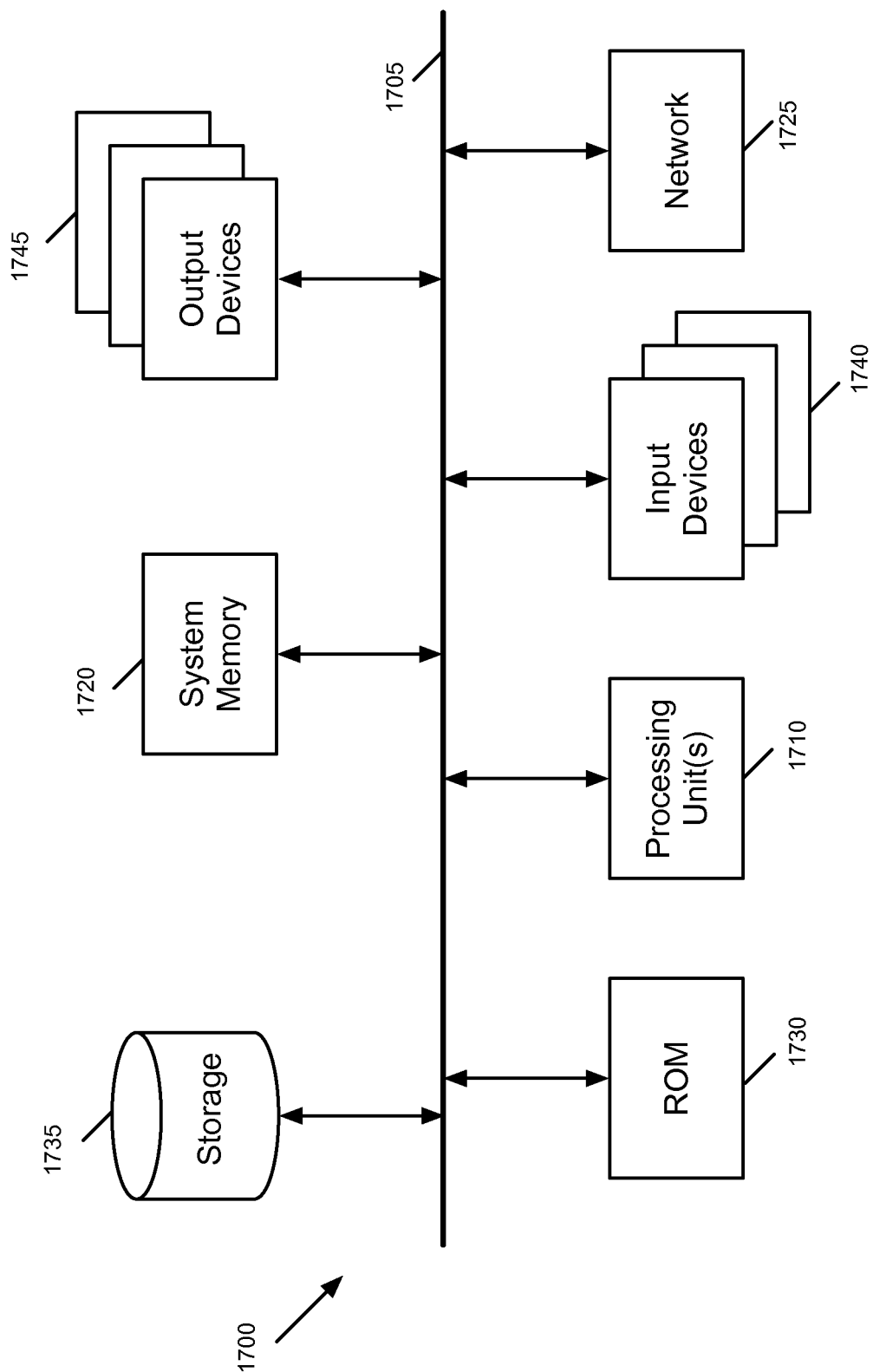
FIG. 17 conceptually illustrates an electronic system with which some embodiments of the invention are implemented.

FIG. 17 conceptually illustrates an electronic system 1700 with which some embodiments of the invention are implemented. The electronic system 1700 can be used to execute any of the control, virtualization, or operating system applications described above. The electronic system 1700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1700 includes a bus 1705, processing unit(s) 1710, a system memory 1720, a read-only memory (ROM) 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the system memory 1720, and the permanent storage device 1735.

From these various memory units, the processing unit(s) 1710 retrieve instructions to execute and data to process in order to execute the processes of the invention. The processing unit(s) may be a single processor or a multi-core processor in different embodiments.

The read-only-memory 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1720 is a read-and-write memory device. However, unlike storage device 1735, the system memory is a volatile read-and-write memory, such a random access memory. The system memory stores some of the instructions and data that the processor needs at runtime. In some embodiments, the invention's processes are stored in the system memory 1720, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 4, 6, and 8-15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of performing remote direct memory access (RDMA) between first and second host computers respectively executing first and second virtual machines (VMs) associated with a logical overlay network, the method comprising:
   at a first physical network interface controller (PNIC) of the first host computer:
      receiving an RDMA request that the first VM sends to the first PNIC;
      receiving, from a program executing on the first host computer, overlay network address mapping data that identifies the logical overlay network associated with the first VM;
      encapsulating the RDMA request with an encapsulation header that identifies the logical overlay network;
      sending the encapsulated RDMA request to a second PNIC of the second host computer to decapsulate the RDMA request and to send the decapsulated RDMA request directly to the second VM executing on the second host computer.

2. The method of claim 1 further comprising encapsulating, at the first PNIC, the received RDMA request with an RDMA data transfer header.

3. The method of claim 1 further comprising:
   at the first PNIC:
      receiving RDMA data from the second VM; and
      directly inserting the RDMA data from the first PNIC into a memory buffer of the first VM bypassing a virtualization software over which the first VM executes on the first host computer.

4. The method of claim 1 further comprising:
   at the second PNIC:
      receiving RDMA data from the first VM; and
      directly inserting the RDMA data from the second PNIC into a memory buffer of the second VM bypassing a virtualization software over which the second VM executes on the second host computer.

5. The method of claim 1 further comprising:
   prior to receiving the RDMA request, creating a unique connection identifier for an RDMA connection between the first and second VMs; and
   establishing the RDMA connection between the first and second VMs.

6. The method of claim 5 further comprising:
creating a first queue pair on the first host computer and a second queue pair on the second host computer, each queue pair comprising a send queue and a receive queue; and
associating the overlay network with the first and second queue pairs.

7. The method of claim 1, wherein the overlay network is an L2 overlay network.

8. The method of claim 1, wherein the overlay network is a virtual extensible local area network (VXLAN).

9. The method of claim 1, wherein the RDMA uses RDMA over Converged Ethernet (RoCE) and Internet Wide Area RDMA Protocol (iWARP).

10. The method of claim 1, wherein the logical overlay network is one logical overlay network amongst a plurality of logical overlay networks that are defined over a common physical network.

11. A non-transitory machine readable medium storing a first program which when executed by at least one processing unit of a first physical network interface controller (PNIC) of a first computer performs remote direct memory access (RDMA) between the first host computer and a second host computer respectively executing first and second virtual machines (VMs) associated with a logical overlay network, the first program comprising sets of instructions for:
receiving an RDMA request that the first VM sends to the first PNIC;
receiving, from a second program executing on the first host computer, overlay network address mapping data that identifies the logical overlay network associated with the first VM;
encapsulating the RDMA request with an encapsulation header that stores an identifier that identifies the logical overlay network;
sending the encapsulated RDMA request to a second PNIC of the second host computer to decapsulate the RDMA request and to send the decapsulated RDMA request directly to the second VM executing on the second host computer.

12. The non-transitory machine readable medium of claim 11, the first program further comprising a set of instructions for encapsulating, at the first PNIC, the received RDMA request with an RDMA data transfer header.

13. The non-transitory machine readable medium of claim 11, the first program further comprising sets of instructions for:
at the first PNIC:
receiving RDMA data from the second VM; and
directly inserting the RDMA data from the first PNIC into a memory buffer of the first VM bypassing a virtualization software over which the first VM executes on the first host computer.

14. The non-transitory machine readable medium of claim 11, wherein the second PNIC (i) receives RDMA data from the first VM and (ii) directly inserts the RDMA data from the second PNIC into a memory buffer of the second VM bypassing a virtualization software over which the second VM executes on the second host computer.

15. The non-transitory machine readable medium of claim 11, the first program further comprising sets of instructions for:
prior to receiving the RDMA request, creating a unique connection identifier for an RDMA connection between the first and second VMs; and
establishing the RDMA connection between the first and second VMs.

16. The non-transitory machine readable medium of claim 15, the first program further comprising sets of instructions for:
creating a first queue pair on the first host computer and a second queue pair on the second host computer, each queue pair comprising a send queue and a receive queue; and
associating the overlay network with the first and second queue pairs.

17. The non-transitory machine readable medium of claim 11, wherein the overlay network is an L2 overlay network.

18. The non-transitory machine readable medium of claim 11, wherein the overlay network is a virtual extensible local area network (VXLAN).

19. The non-transitory machine readable medium of claim 11, wherein the RDMA uses RDMA over Converged Ethernet (RoCE) and Internet Wide Area RDMA Protocol (iWARP).

20. The non-transitory machine readable medium of claim 11, wherein the logical overlay network is one logical overlay network amongst a plurality of logical overlay networks that are defined over a common physical network.

* * * * *